US010238031B2

(12) United States Patent
D'Arrigo et al.

(10) Patent No.: US 10,238,031 B2
(45) Date of Patent: Mar. 26, 2019

(54) HARVESTER FOR LEAFY PLANTS

(71) Applicant: D'Arrigo Bros Co. of California, Salinas, CA (US)

(72) Inventors: Michael Anthony D'Arrigo, Monterey, CA (US); Anthony Dejesus Sandoval, Watsonville, CA (US); Hector Amando Camacho Garcia, Salinas, CA (US); Peter Frits de Groot, Carmel, CA (US)

(73) Assignee: D'Arrigo Bros Co. of California, Salinas, CA (US)

( * ) Notice: Subject to any disclaimer, the term of this patent is extended or adjusted under 35 U.S.C. 154(b) by 22 days.

(21) Appl. No.: 15/498,313

(22) Filed: Apr. 26, 2017

(65) Prior Publication Data

US 2018/0035611 A1    Feb. 8, 2018

Related U.S. Application Data

(60) Provisional application No. 62/370,589, filed on Aug. 3, 2016.

(51) Int. Cl.
*A01D 46/30* (2006.01)
*A01D 45/26* (2006.01)

(52) U.S. Cl.
CPC ........... *A01D 46/30* (2013.01); *A01D 45/263* (2013.01)

(58) Field of Classification Search
CPC ............... Y10S 901/01; A23N 15/003; G05B 2219/45105; G05B 2219/45017; G06T 2207/30188; B25J 19/021; B25J 9/1697; B25J 15/0206; B25J 15/10; A01D 46/30; A01D 45/263; A01D 45/26; A01D 34/008

USPC ....... 701/50, 23; 99/547, 544, 564, 642, 643
See application file for complete search history.

(56) References Cited

U.S. PATENT DOCUMENTS

| 3,821,987 A | * | 7/1974 | Shepardson | ......... A01D 45/263 171/38 |
| 4,453,458 A | * | 6/1984 | Altman | ................ A23N 15/003 99/544 |
| 4,663,925 A | * | 5/1987 | Terada | .................... A01D 46/24 382/153 |
| 4,843,561 A | * | 6/1989 | Larson | ................... A01D 46/24 209/587 |
| 5,121,589 A | * | 6/1992 | Ventura | .................. B65B 25/04 53/240 |
| 5,560,190 A | * | 10/1996 | Ottaway | .............. A01D 45/263 56/327.1 |

(Continued)

OTHER PUBLICATIONS

"Delta Robot", Wikipedia Intenet web page, original publication date unknown (page marked "last modified Mar. 9, 2016"), page downloaded Jul. 12, 2016 from Internet address: https://en.wikipedia.org/wiki/Delta_robot.

(Continued)

*Primary Examiner* — Arpad Fabian-Kovacs
(74) *Attorney, Agent, or Firm* — GSS Law Group; Gregory S. Smith; Phillip M. Wagner

(57) ABSTRACT

A support frame; a cut and lift mechanism coupled to the support frame; a tool carrying platform coupled to the cut and lift mechanism; an outer leaf removal device coupled to the tool carrying platform; a cutting tool coupled to the tool carrying platform; a controller in data communication with the cut and lift robot; and a plant center locator in data communication with the controller.

18 Claims, 25 Drawing Sheets

(56) References Cited

U.S. PATENT DOCUMENTS

| | | | | |
|---|---|---|---|---|
| 6,378,281 B1* | 4/2002 | Ottaway | ............... | A01D 45/263 56/327.1 |
| 7,395,653 B2* | 7/2008 | de Groot | ............... | A23N 15/003 426/484 |
| 7,712,296 B2* | 5/2010 | Costa | ................... | A01D 45/263 56/327.1 |
| 8,272,200 B1* | 9/2012 | Ottaway | ............... | A01D 45/263 56/327.1 |
| 8,306,663 B2* | 11/2012 | Wickham | ................ | B25J 9/1679 700/259 |
| 8,312,701 B1* | 11/2012 | Albarran | .............. | A01D 45/263 171/38 |
| 8,744,626 B2* | 6/2014 | Johnson | ............... | A01D 34/008 700/250 |
| 2005/0038587 A1* | 2/2005 | Berg | ....................... | A01D 46/28 701/50 |
| 2005/0126144 A1* | 6/2005 | Koselka | ................. | A01D 46/30 56/10.2 R |
| 2006/0213167 A1* | 9/2006 | Koselka | ................. | A01D 46/30 56/10.2 A |
| 2016/0157428 A1* | 6/2016 | Pitzer | ..................... | A01D 46/30 701/50 |
| 2016/0157429 A1* | 6/2016 | Pitzer | ..................... | A01D 46/30 701/23 |
| 2016/0157430 A1* | 6/2016 | Pitzer | ..................... | A01D 46/30 56/331 |
| 2016/0157431 A1* | 6/2016 | Pitzer | ..................... | A01D 46/30 56/331 |
| 2016/0161238 A1* | 6/2016 | Pitzer | ...................... | G01B 5/14 56/10.2 E |
| 2017/0000027 A1* | 1/2017 | Hunt | ..................... | A01D 46/30 |
| 2018/0092304 A1* | 4/2018 | Moore | .................... | B25J 5/007 |

OTHER PUBLICATIONS

"Industrial robots: What are the different types?", original publication date unknown, author unknown, downloaded Apr. 8, 2017 from address: http://blog.robotiq.com/bid/63528/what-are-the-different-types-of-industrial-robots.

Harburg, Dan, "Robotics: Opportunities and Challenges in Automating the Produce Industry", Western Growers webinar slides, Mar. 29, 2017.

Phenospex Planteye 400 internet web page at address: https://phenospex.com/products/plant-phenotyping/science-planteye-3d-laser-scanner/planteve-f400-technology/ Author and original publication date unknown but prior to May 2016.

* cited by examiner

View A

View B

Alternative View B

Section A-A

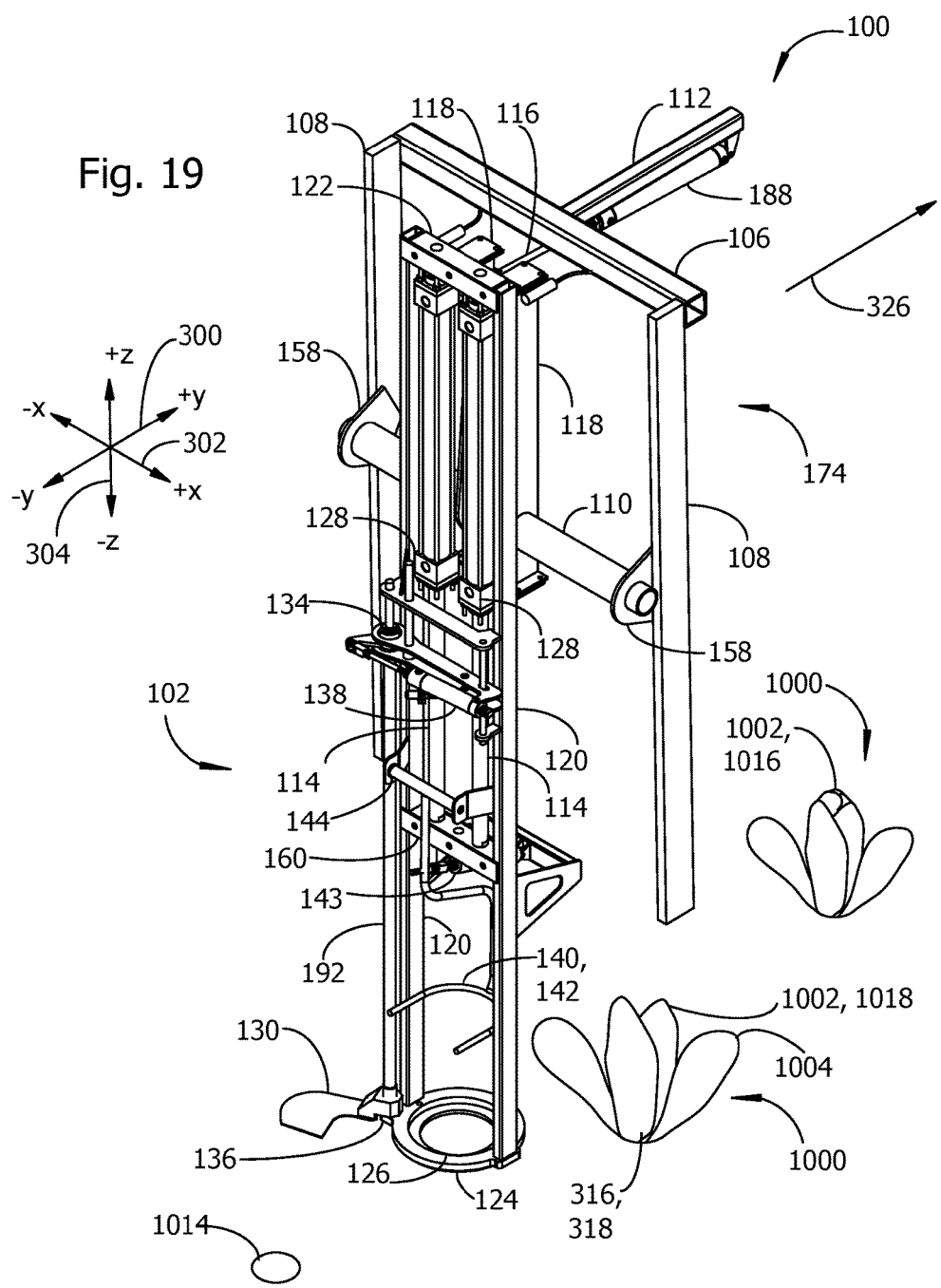

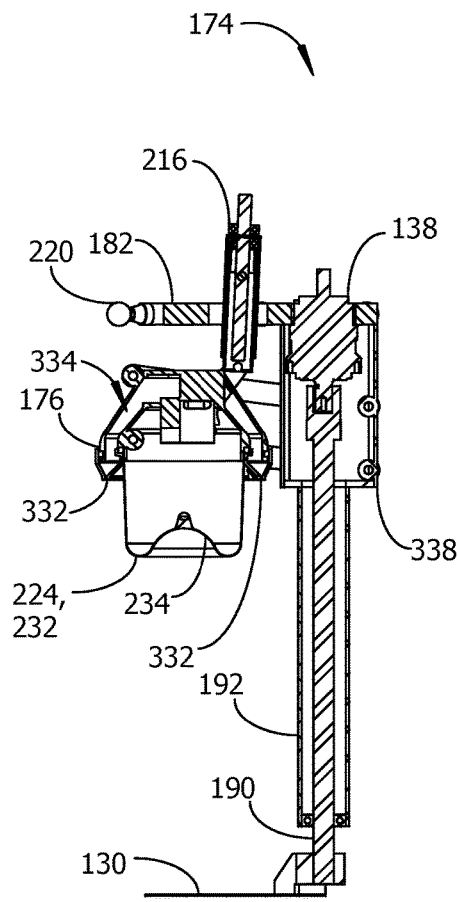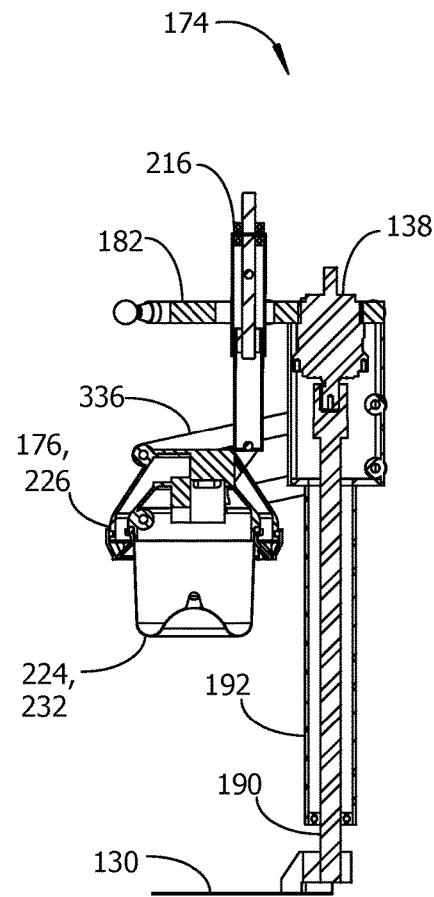
Section C-C
Fig. 30
Alternate Section C-C
Fig. 31

HARVESTER FOR LEAFY PLANTS

CROSS REFERENCE TO RELATED APPLICATIONS

This application claims the benefit of U.S. Provisional Patent Application No. 62/370,589, filed Aug. 3, 2016, incorporated herein by reference in its entirety.

FIELD OF THE INVENTION

Embodiments are related to apparatus for cutting and trimming leafy plants such as lettuce and endive.

BACKGROUND

Harvesting lettuce and other leafy food plants is a labor-intensive process. The economically valuable part of lettuce and similar plants is a compact core of leaves growing close to the ground in densely-packed rows. The core may be surrounded by loose outer leaves that may be discarded when the plant is harvested. Lettuce and similar leafy plants are easily crushed or bruised by rough handling. Harvesting may be accomplished by manually cutting each plant close to the ground with a knife without cutting through the core, one plant at a time. When a plant is harvested, it may be preferable to remove some of the outer, loose leaves wrapped around the compact core. Cutting a plant too high above the ground surface may cause damage to the economically valuable core by severing too many leaves. Cutting a plant too close to the ground surface may cause the knife to contact the ground, after which the knife may need to be cleaned to protect cut plants from contamination. The knife may need to be sharpened after ground contact.

The person harvesting the plants works for extended periods in a stooped or bent-over position and must take care not to damage the harvested plant or cause personal injury with the harvesting knife. Because the work is physically demanding, when an entire field is ready for harvesting, it may be difficult to quickly find enough people skilled in the preferred harvesting method to collect the crop before produce spoils or is damaged by the weather. Furthermore, because the harvested plant is a food item, it would be preferable to minimize the risk of contamination by avoiding human contact with the plant before delivering it to a buyer.

SUMMARY

An example apparatus embodiment includes a support frame; a cut and lift robot coupled to the support frame; a tool carrying platform coupled to the cut and lift robot; an outer leaf removal device coupled to the tool carrying platform; a cutting tool attached to a cutting tool shaft, wherein the cutting tool shaft is rotatably coupled to the tool carrying platform; a controller in data communication with the cut and lift robot; and a plant center locator in data communication with the controller.

The example apparatus may further include a top plate attached to the support frame and to the cut and lift robot; a cutting tool actuator attached to the top plate, wherein the cutting tool actuator is in data communication with the controller; a core stabilizer vertical position actuator attached to the top plate, wherein the core stabilizer vertical position actuator is in data communication with the controller; a first cardan shaft connected to the cutting tool actuator and to the cutting tool shaft; and a second cardan shaft connected to the core stabilizer vertical position actuator and rotatably coupled to the tool carrying platform.

The example apparatus may further include a parallel-arm frame rotatably coupled to the tool carrying platform; a gearbox attached to the tool carrying platform, to the second cardan shaft, and to the parallel arm frame, wherein a rotation of the core stabilizer vertical position actuator rotates the second cardan shaft and selectively raises and lowers the parallel-arm frame relative to the tool carrying platform.

The example of an outer leaf removal device may further include a cap formed with a first interior void space; a base formed with an aperture in fluid communication with the first interior void space, wherein the aperture is positioned to direct a flow of pressurized air from the first interior void space downward onto a plant to be harvested; and a core stabilizer attached to the base, wherein the core stabilizer is formed with a second interior void space and a plurality of flexible fingers.

The example apparatus may further include a first inlet coupler for an air hose, wherein the first inlet coupler is in fluid communication with the first interior void space; and a second inlet coupler for an air hose, wherein the second inlet coupler is in fluid communication with the second interior void space.

The example apparatus may further include a conveyor attached to the support frame and a conveyor lift in data communication with the controller. The conveyor may optionally be a v-trough conveyor.

The example apparatus may further include a height sensor in data communication with the controller, wherein the height sensor is positioned to measure a height above ground of a blade height reference location for setting a cutting height of the cutting tool.

The plant center locator may optionally include an optical scanner and/or a camera.

The example apparatus may further include a lateral positioner having a movable part attached to the support frame and a stationary part adapted for attachment to a transport.

The example apparatus may further include a core ejector attached to the tool carrying platform, wherein the core ejector is positioned to push a harvested plant out of the outer leaf removal device.

The example apparatus may further include a protection cage attached to the support frame, wherein the protection cage surrounds the cut and lift robot. The cut and lift robot may optionally be a delta robot.

The cutting tool may be formed with a plurality of ridges on a top surface of the cutting tool, wherein each of the plurality of ridges is formed with a triangular profile. The triangular profile may taper toward a cutting edge of the cutting tool.

The example apparatus may further include a rotary encoder in data communication with the controller, wherein the rotary encoder is operable to output a pulse output signal comprising a fixed number of pulses for a full revolution of a wheel.

The controller in the example apparatus may set a longitudinal cutting position for the cutting tool in response to a count of pulses from the pulse output signal and a sensed plant center position from the plant center locator. The controller may convert each plant center coordinate in a longitudinal direction from the plant center locator to a pulse count value referenced to a home position of the cut and lift robot. The controller and the cut and lift robot may position the cutting tool to produce a harvested plant core with a preferred core diameter.

BRIEF DESCRIPTION OF THE DRAWINGS

FIG. 19 is a pictorial view of an alternative example of a cutting and lifting mechanism included with some harvester embodiments.

FIG. 30 shows a cross-sectional view C-C of the example embodiment of FIGS. 28-29.

FIG. 31 shows an alternate cross-sectional view C-C in which an actuator has pushed the examples of an outer leaf removal device and core stabilizer vertically downwards compared to FIG. 30.

DESCRIPTION

Figure 1:
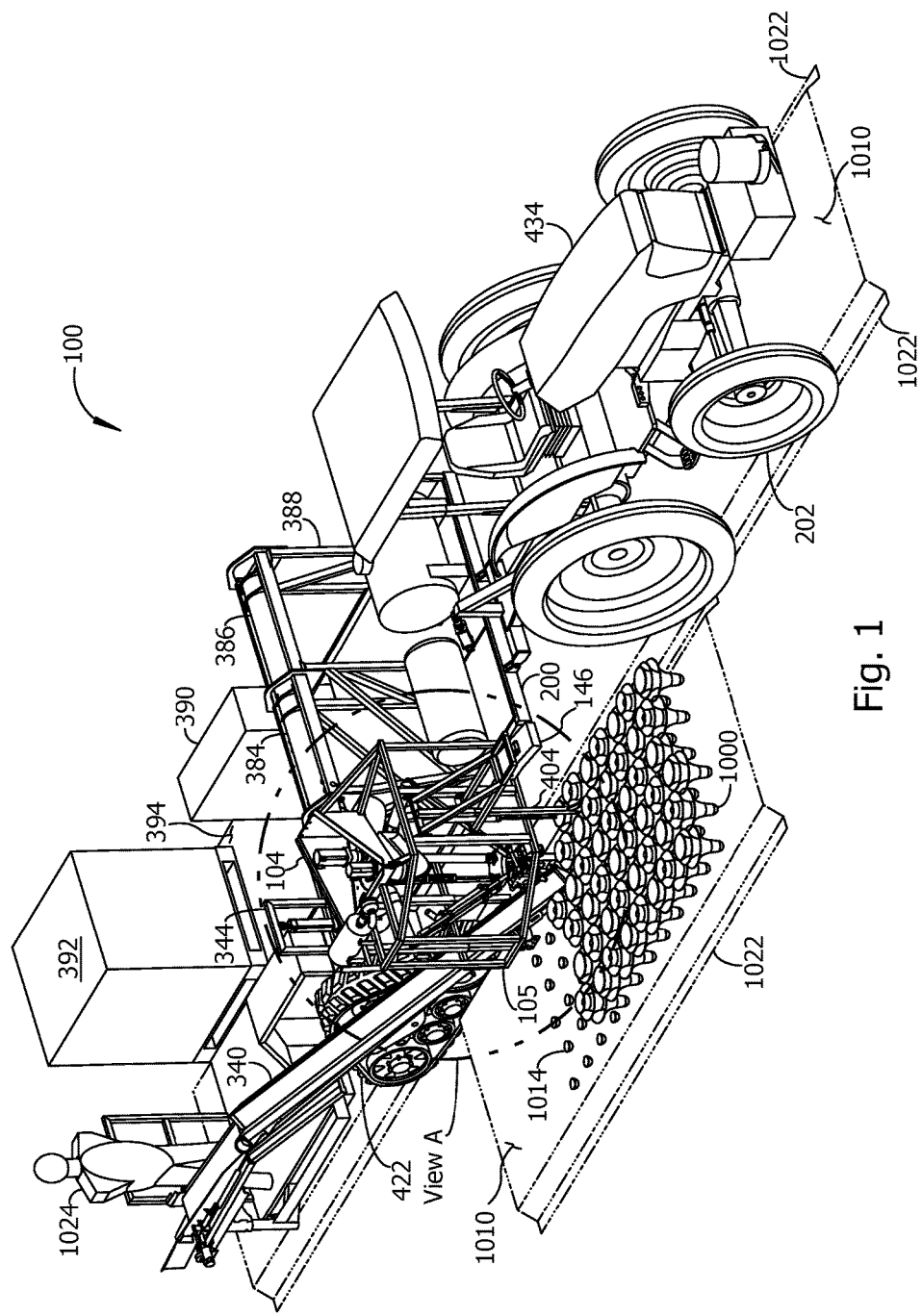
FIG. 1 is a pictorial view from above of an example embodiment of a harvester harvesting a crop of leafy plants.

Example embodiments in accord with the invention are described herein. In some embodiments, a cut and lift mechanism and a plant center locator are coupled to a support frame carried by a transport capable of moving between rows of leafy plants to be harvested. In some embodiments, a lateral positioner with a support beam having a movable part attached to the support frame and a stationary part attached to a lateral positioner frame may move the cut and lift mechanism laterally across a row of plants to be harvested as the transport advances longitudinally along rows. While the transport moves continuously along a row, the plant center locator accurately locates a center of a plant to be harvested, a controller accurately positions a cutting tool at the located center of the plant, and the cutting tool removes the plant from its stem without cutting into or bruising an economically valuable core section of the plant. Each cut core is processed to remove unwanted outer leaves after the plant is cut from its stem. Cut cores with unwanted outer leaves removed are lifted from the cut stem and ejected onto a conveyor or into a bin without damaging the core.

Embodiments may operate autonomously without human intervention to sense the center position of each plant to be harvested, position a cutting tool in a preferred position for cutting a selected plant, cut the plant from its roots without damaging the plant core, remove some outer leaves from the plant, and eject the trimmed plant core onto a conveyor. In some embodiments, the height of the cutting tool is positioned automatically in response to data collected by the plant center locator to produce a cut core having a preferred core diameter. A harvester embodiment may run continuously while the transport moves along a row of plants, identifying plant centers and sending center position information to a controller that directs detection, measurement, cutting, and outer leaf removal operations. In an optional mode of operation, an embodiment may operate with the assistance of a person, who may review a camera image of a plant to be harvested, optionally mark the center of the plant to be harvested, optionally set a cutting height for the cutting tool, and optionally cause the cutting tool to cut the plant from its stem.

Field trials have shown that an embodiment with one cut and lift mechanism may cut plants one at a time, remove outer leaves from the cut plant core, and eject trimmed cores onto a conveyor for collection and packaging, at a rate at least four times the number of cores per minute harvested by a skilled agricultural worker. A single transport may carry a plurality of cut and lift mechanisms and core locators to simultaneously harvest more than one row of leafy plants as the transport moves along the rows. Each cut and lift mechanism may be positioned to harvest plants from more than one plant line in one pass along a row of plants. Each cut and lift mechanism may have an associated plant center locator. Alternatively, one plant center locator may provide plant center location data to more than one cut and lift mechanism. A plant center locator may collect data and determine plant center locations from plants in more than one plant line. The sequence of detecting plant center positions, positioning and operating the cut and lift mechanism, and ejecting the cut cores onto a conveyor may be accomplished without a person touching the plants to be harvested or the harvested plant cores.

An example harvester embodiment 100 is shown in a pictorial diagram in FIG. 1. As suggested in the example of FIG. 1, a tractor 434 or other tow vehicle pulls a transport 200 along furrows or wheel tracks 1022 separating rows 328 of plants to be harvested 1000. In some embodiments, the transport 200 is self-propelled and does not require a tow vehicle. Examples of a transport 200 include, but are not limited to, a tractor, a wagon pushed or pulled by a tractor, or a self-propelled vehicle such as a truck, or another motorized conveyance. The transport 200 may be fitted with wheels 202 and/or tracks 422. Tracks 422 may be referred to as caterpillar tracks 422.

The transport 200 carries a lateral positioner 116 including a movable part 384 and a stationary part 386 supported by a lateral positioner frame 388. The lateral positioner frame may be attached to a surface of the transport 200, for example a blade height reference surface 394, which may be the surface of a deck of the transport 200. The blade height reference surface 394 may be maintained level and at a preferred constant separation distance above the soil surface 1010 in response to signals from a height sensor 404. Other parts of the harvester embodiment 100 may use the blade height reference service 394 for setting positions of movable components in a vertical (z-axis) direction perpendicular to the soil surface. A support frame 104 attached to the lateral positioner 384 supports a protection cage 105, a cut and lift mechanism 174, a plant center locator 146, and other components as will be explained in more detail with respect to View A marked in FIG. 1 by a circle drawn with a heavy border line. A weathertight enclosure 390 protects electrical and electronic components of the harvester 100 from dust, rain, and mechanical damage. A cut and lift mechanism 174 may alternatively be referred to herein as a cut and lift robot 174.

A conveyor 340 is attached to the transport 200 and cage 105 by a conveyor lift frame 344. The conveyor lift may lift the conveyor when the harvester 100 is turned at the end of a row 328 and at other times. A symbolic representation of a person 1024 is shown next to the conveyor 340. The person may remove cut and trimmed plant cores from the conveyor and place the harvested plant cores in boxes or bins in a storage area 392 aboard the transport 200. In the example of FIG. 1, the conveyor is a V-trough conveyor 340 comprising two conveyor belts arranged with an angle between the top surfaces of the belts of less than 180 degrees. A V-trough conveyor may be advantageous for preventing harvested plant cores from rolling down the inclined path of the conveyor from the end close to the position near the person 1024 to the end close to the ground under the protection cage 105.

Figure 2:
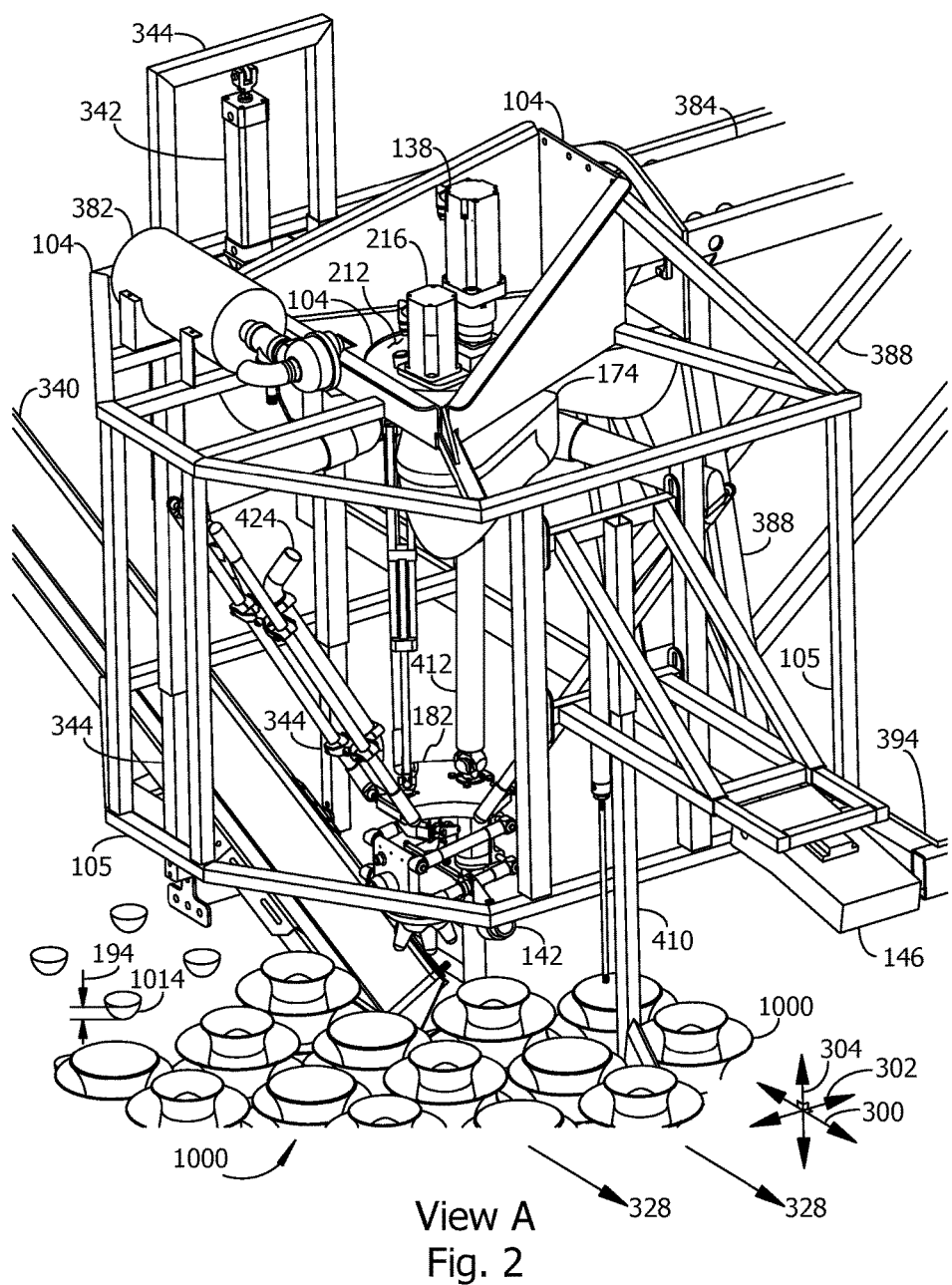
FIG. 2 is a pictorial view A of an example of a cut and lift mechanism and a conveyor positioned for harvesting plants. A cut and lift mechanism may alternatively be referred to herein as a cut and lift robot. A location for view A is marked in FIG. 1.
Figure 5:
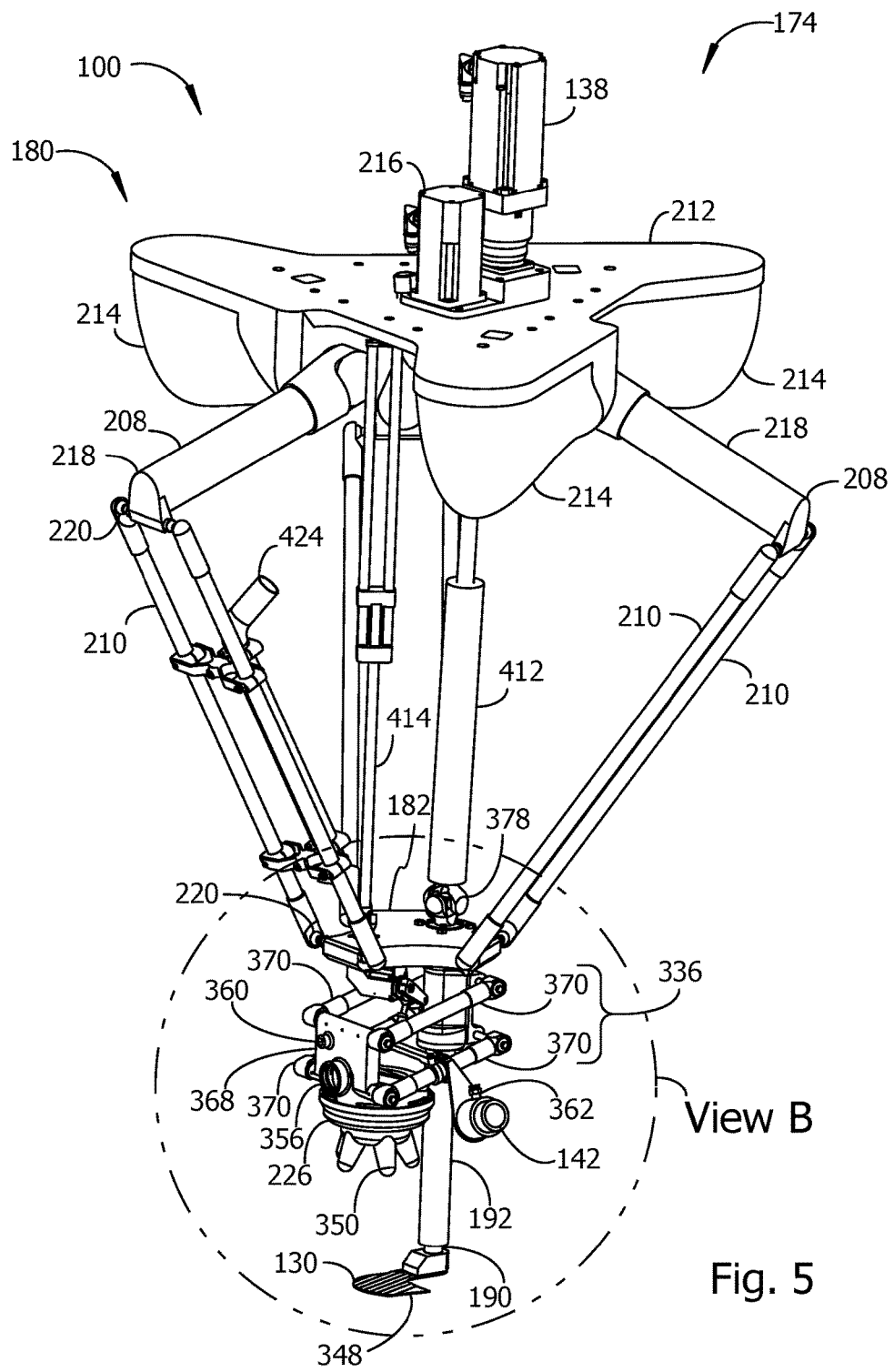
FIG. 5 is a pictorial view showing details of the examples of a cut and lift robot and tool carrying platform (TCP) from FIG. 1, and further illustrating an example of an outer leaf removal device in a lowered position. A cut and lift robot may alternatively be referred to herein as a cut and lift mechanism.

View A in FIG. 2 shows more details of an example harvester embodiment 100. The support frame 104 is attached to a lateral support beam 384 connected to, or alternatively forming, the movable part of the lateral positioner 116. Parts of the lateral positioner frame 388 for connecting the lateral positioner to the transport 200 are visible in FIG. 2, as is an edge of the blade height reference surface 394. The protection cage 105 attaches to the support frame 104 to protect nearby persons from contact with autonomously moving parts of the harvester 100 and to protect parts of the harvester from collision damage. The plant center locator 146, positioned on a bracket attached to the protection cage 105, determines the center coordinates of plants 1000 in the x- or lateral direction (302), the y- or longitudinal direction (300), and the z-direction (height above the soil surface) while the harvester 100 advances along rows 328 of plants to be harvested 100. The cut and lift robot 174, also referred to herein as a cut and lift mechanism 174, is attached by its top plate (ref. FIG. 5) to the support frame 104. The height sensor 404 is attached to a support member 410 connected to the protection cage 105 near the plant center locator 146 on the front side of the cage. The conveyor lift frame 344 raises and lowers the end of the conveyor 340 by operation of the conveyor lift actuator 342 coupled to the lift frame 344 and the protection cage 105.

A compressed air reservoir 382 provides pressurized air to an air cannon and core ejector in an outer leaf removal device attached to a tool carrying platform 182. Air passes through a compressed air pipe 424. Tubing and hoses connecting the air reservoir 382 to the air pipe 424 and other components have been omitted from the views.

A cutting tool actuator 138 and core stabilizer vertical position actuator 216 are attached to the top plate 212 of the cut and lift robot 174. Placing the cutting tool actuator and core stabilizer vertical position actuator on the top plate reduces the amount of weight carried by the TCP and allows the TCP to accelerate more quickly than if the actuators were carried by the TCP, thereby increasing the number of plants that can be harvested per unit time. A blade drive shaft 412, also referred to as a first cardan shaft, rotatably couples the cutting tool actuator 138 to the tool carrying platform (TCP) 182 and to a central drive shaft 190 for the cutting tool 130. A core hold down drive shaft 414 (ref. FIG. 5), also referred to as a second cardan shaft, rotatably couples the core stabilizer vertical position actuator 216 to the TCP 182 and to a parallel arm frame for raising and lowering a core stabilizer. A core ejector 142, partially hidden by the protection frame 105, is positioned to eject harvested plant cores from the harvester 100 onto the conveyor 340. After a plant is harvested, a remnant cut stem 1014 remains. The height of the cut stem may correspond to the height setting 194 of the cutting tool 130.

Figure 3:
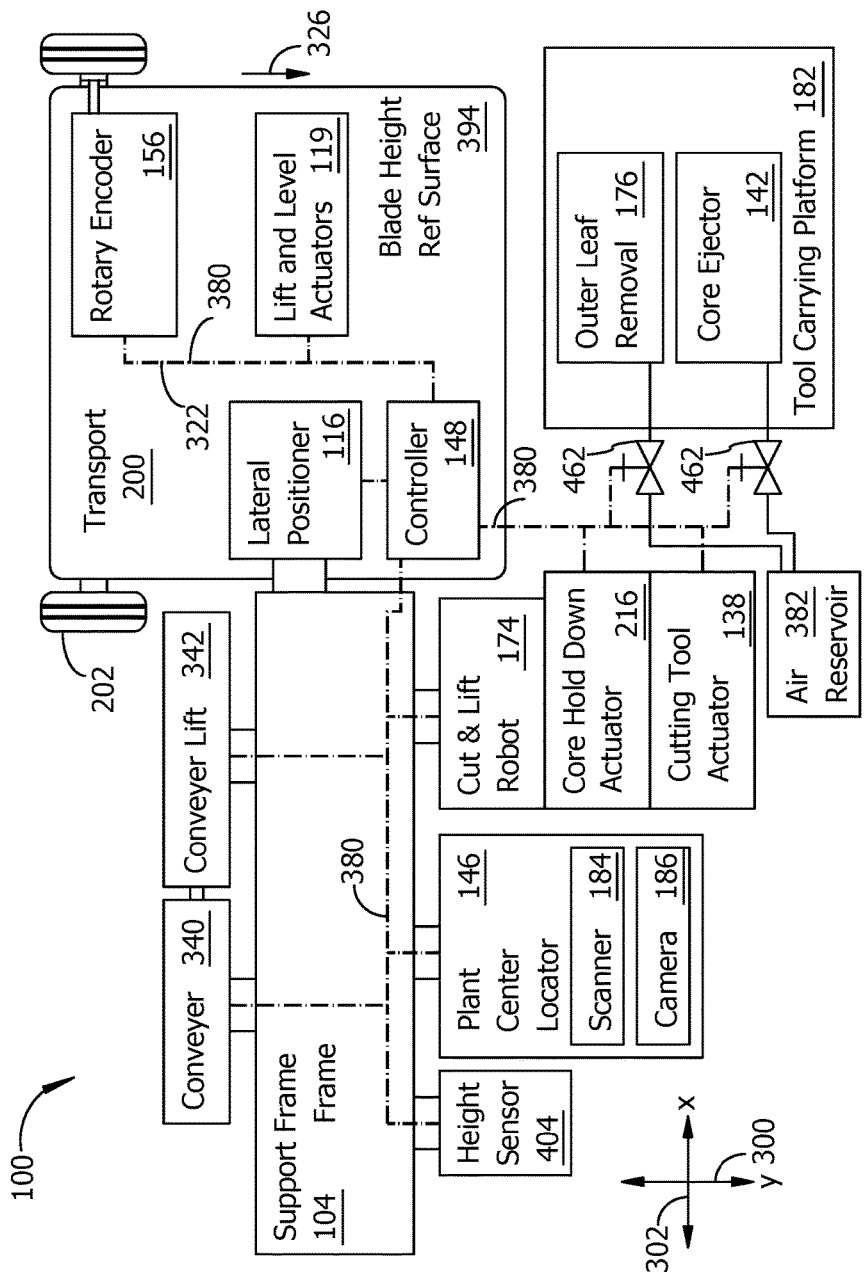
FIG. 3 is a block diagram showing examples of connections between components of an example harvester embodiment.

FIG. 3 shows a block diagram representation of electrical and pneumatic connections between components of the harvester embodiments of FIGS. 1-2. The transport 200 carries the lateral positioner 116 and other parts of the harvester. Transport lift and level actuators 119 respond to commands from the controller 148 and height sensor 404 to keep the blade height reference surface 394 level and at a constant height above the soil surface of a planted field. A rotary encoder 156 coupled to a wheel 202 outputs a stream of pulses in a pulse output signal 322 over electrical connections 380 to the controller 148. The pulse output signal 322 preferably includes a constant number of pulses per complete revolution of a wheel 202, corresponding to a constant number of pulses per unit of linear distance traversed by the transport 200.

The support frame 104 is attached to the lateral positioner 116, the conveyor 340, and the conveyor lift actuator 342. The conveyor 340 and conveyor lift actuator 342 are connected for electrical signal communication with the controller 148. The height sensor 404 and plant center locator 146 are mechanically connected to the support frame 104 and electrically connected with the controller 148. In some embodiments, the plant center locator 146 is a scanner 184, for example an optical scanner. An optical scanner may employee light frequencies outside the normal range of human vision. An optical scanner may be a laser scanner. In an alternative embodiment, the plant center locator is a camera 186. The controller 148 may exchange data and commands with the plant center locator 184 and other parts of an embodiment by wired communications, wireless communications, or a combination of wired and wireless communications.

The plant center locator 146 detects the position of a core of a plant to be harvested and sends the sensed position of the core to the controller. The position of the top of a core may optionally be represented by a separation distance from a datum plane defined with respect to part of an embodiment, for example a coordinate reference position in the plant center locator or a coordinate reference position corresponding to a home position for the cut and lift mechanism. The core locator may further make measurements to determine whether the core is open (i.e., bushy or leafy) or closed (i.e., tightly compacted leaves), and may estimate or measure a percent of biomass of the plant in the upper part of the plant compared to the lower part of the plant. It may be desirable to cut a tightly wrapped core, also referred to as a closed core, at a different height relative to the surface of the ground than a loose or open core. The controller 148 may operate a cutting tool height actuator 178 to set a preferred cutting height for an open core, and a different preferred cutting height for a closed core. These parameters may be used, one at a time or in any combination, by the controller to set a cutting height of a cutting tool 130 for severing the core from its stem, based on an estimate of the size of the core. For example, the controller may set the cutting height to achieve a core having a preferred outer diameter. The controller may further make a decision about whether or not to harvest a plant based on an estimate of the size of the core resulting from measurements by the plant center locator 146.

The cut and lift robot 174 is attached to the support frame 104 and moves the tool carrying platform 182 in response to coordinates received from the controller 148. A core stabilizer vertical position actuator 216 and cutting tool actuator may be attached to a top plate 212 attached to, or alternatively included as part of, the cut and lift robot 174. The core hold down actuator is operated by the controller 148 to lower a core stabilizer (ref. FIG. 5) onto a plant being cut and raise the core stabilizer to eject the cut plant core onto the conveyor 340. The cutting tool actuator 138 is operated by the controller 148 to rapidly rotate the cutting tool 130 used to sever a plant from its stem. The controller 148 may direct the cut and lift robot 174 to raise or lower the tool carrying platform 182 to place the cutting tool 130 at a preferred vertical separation distance from the blade height reference surface 394.

After a plant is cut, the controller 148 may keep the cutting tool 130 under the cut plant while a strong pulse of air is directed downward onto the plant by the outer leaf removal device 176 to remove outer leaves surrounding the plant core. The outer leaf removal device receives air for the air pulse through a valve 462 operated by the controller 380 to admit air from the air reservoir 382 into the outer leaf removal device 176. Another valve 462 operated by the controller 148 directs a strong pulse of air from the core ejector 142 at the cut plant core after loose outer leaves are removed to push the core onto the conveyor 340. The controller 148 may rotate the cutting tool while firing to core ejector to tip a cut plant core onto the conveyor in a preferred orientation with the longest axis of the core parallel to the direction of motion of the conveyor belts. The cut plant core may be less likely to roll down the conveyor in the preferred orientation.

Figure 4:
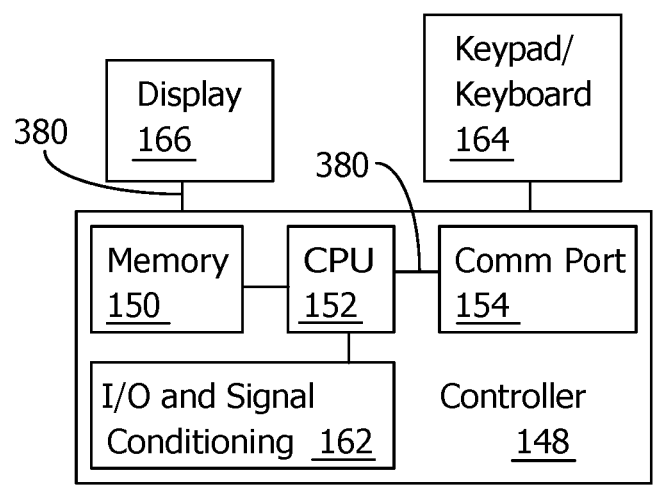
FIG. 4 is a block diagram showing examples of data communication connections between components associated with the example controller of FIG. 3.

The example of a controller 148 in FIG. 3 and FIG. 4 preferably includes a central processing unit (CPU) 152 implemented in hardware. The CPU may be connected for data communication with a memory 150, an Input, Output, and Signal Conditioning circuit 162, and a communications port 154. Examples of peripheral devices that may be coupled to the CPU 152 through the intervening I/O and Signal Conditioning circuits 162, include, but are not limited to, a keyboard or keypad 164, a display 166, and a wireless bidirectional communications transceiver.

Plants may vary in position laterally (across a row) and longitudinally (along a row). The controller 148 may therefore command the lateral positioner 116 to move the cut and lift mechanism 174 and other components attached to the support frame 104 laterally with respect to a previous cutting position. Accurate lateral positioning may avoid partially severing a plant stem or missing the stem entirely, even when the cutting tool is at a correct longitudinal position.

Figure 6:
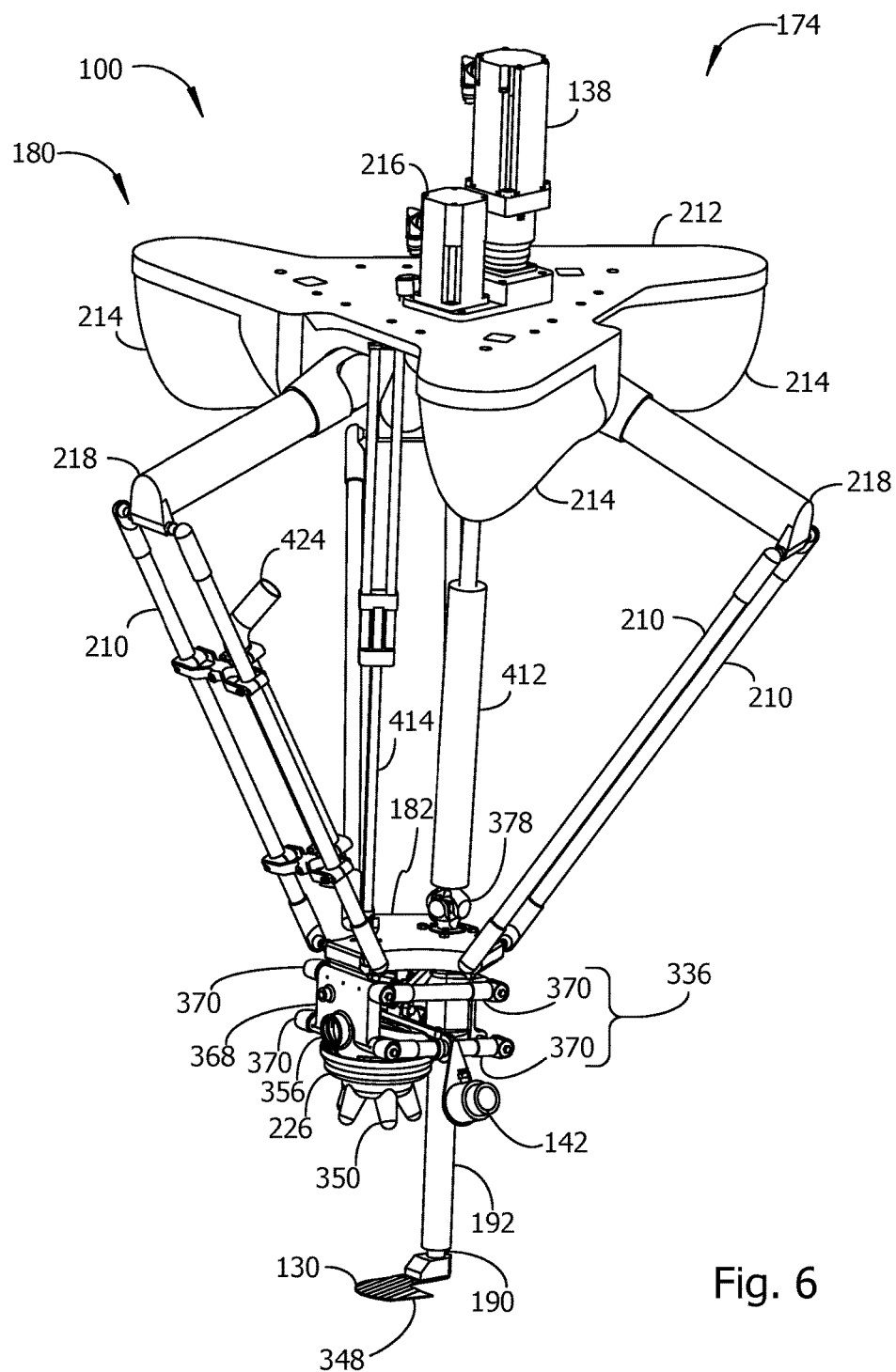
FIG. 6 is another pictorial view of the examples of the cut and lift robot and TCP from FIG. 5, with the outer leaf removal device in an example of a raised position.

FIGS. 5-6 show examples of a cut and lift mechanism 174. The example cut and lift mechanism 174 may be referred to as a parallel-arm robot 180 or a delta robot 180. In alternative embodiments, the cut and lift mechanism 174 may use a serial link robot, a Cartesian robot, or a gantry robot. The example delta robot in FIGS. 5-6 includes three arms 208, two of which are visible in FIG. 5. Each arm 208 includes an upper arm 218 segment rotatably coupled to two parallel links 210. Each of the parallel links 210 couples to a tool carrying platform 182 through a ball and socket joint 220. Each arm may be raised or lowered by one of three motors inside arm motor housings 214. The example delta robot 180 is preferably attached to the support frame 104 by attaching a top surface of the top plate 212 to the support frame, with the arms 208 reaching downward toward the ground.

An outer leaf removal device 176 and a cutting tool 130 may be movably coupled to the tool carrier 182 by a parallel arm frame 336. The cutting tool 130 is attached to a central drive shaft 190 rotating within a hollow sleeve 192 attached to the TCP 182. The central drive shaft 190 for the cutting tool is driven in rotation by the first cardan shaft 412. The outer leaf removal device 176 may include an air cannon 226 firing bursts of compressed air produced by opening and closing a valve 462. The bursts of air from the air cannon 226 are directed at a cut core to remove outer leaves from the core.

A core stabilizer 224 may be attached to the bottom of the outer leaf removal device 176. The core stabilizer 224 is shaped to engage with the crown of a plant core to be cut, holding the plant core against the cutting tool 130 while the plant is severed from its stem. The core stabilizer 224 also holds the core steady while the air cannon strips off unwanted outer leaves. Air for the air cannon 226 is delivered from the air reservoir, through a valve 462 operated by the controller 148, and into the outer leaf removal device 176 through an air hose inlet coupler 356. In the example of FIG. 5, the parallel arm frame 336 is in an example of a lowered position to enable the core stabilizer 350 to hold a plant to be harvested.

FIG. 6 continues the example of FIG. 5, showing the parallel arm frame and core stabilizer in an example of a raised position with the core stabilizer 350 closer to the TCP 182 in FIG. 6 than in FIG. 5. The core ejector 142, coupled to a valve 462 and the air reservoir 382 at an air coupling 362, is attached to one of the parallel arms 370, moving up and down with the parallel arm frame 336. The parallel arm frame 336 includes four parallel arms 370. Each parallel arm 370 is rotatably joined at a first end to the TCP 182 and at a second end to a core hold down pivot plate 368.

Figure 7:
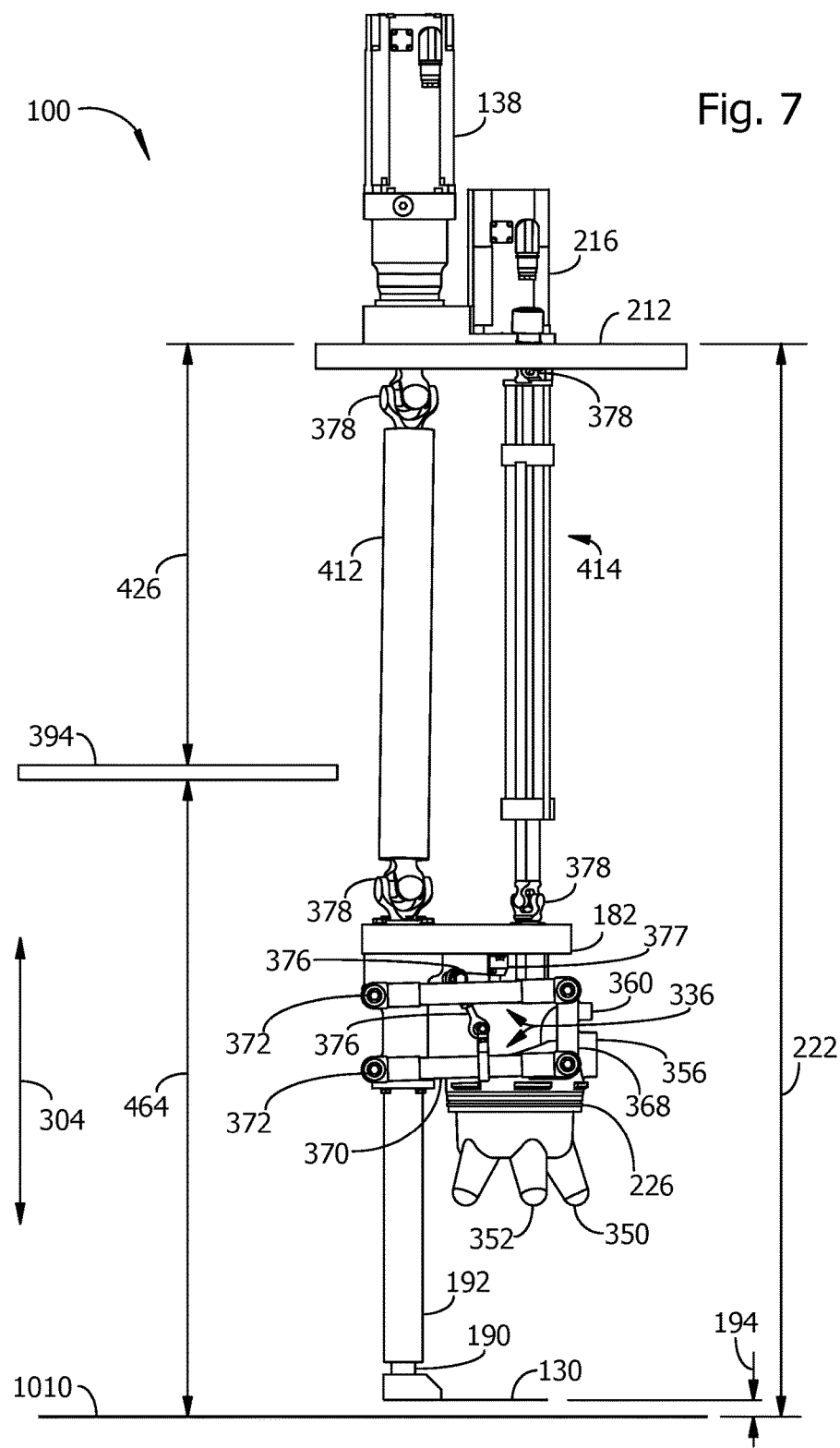
FIG. 7 is a side view of some components connected to an example of a top plate and TCP from the previous figures.

Parts of the cut and lift mechanism in an embodiment 100 are shown in the side view of FIG. 7. In the example of FIG. 7, the delta robot 180 has been omitted except for its top plate 212 to more clearly show connections between the cutting tool actuator 138, the core stabilizer vertical position actuator 216, and components attached to the TCP 182. The top plate 212 is held at a fixed vertical separation distance 426 from the blade height reference surface 394 by the support frame 105, lateral positioner frame 388, and other fixed, intervening structures. The blade height reference surface 394 is held at a selected vertical separation distance 464 from the soil surface 1010 by the lift and level actuators 148 (ref. FIG. 3). Distances (426) and (464) place the top plate a known separation distance 222 from the soil surface. The separation distance 222 may be adjusted by the lift and level actuators 148 under the direction of the controller 148 to set a preferred cutting height 194 of the cutting tool 130 above the soil surface 1010. The cutting height 194 is preferably controlled within +/−0.25 inch from a target cutting height value. The target cutting height value may be an ideal cutting height for maximizing the economic value of a cut plant and may vary from plant to plant.

The examples of the cutting tool actuator 138 and the core stabilizer vertical position actuator 216 are attached to the top plate 212. The cutting tool actuator drives the central drive shaft 190 for the cutting tool 130 in rotation through an upper cardan joint 378, the first cardan shaft 412, and a lower cardan joint 378. The central drive shaft 190 rotates within a hollow sleeve 192 attached to the TCP 182. The cutting tool 130 is attached to the bottom end of the central drive shaft 190. The core stabilizer vertical position actuator 216 is rotatably coupled to a cardan joint 378 at the top end of the second cardan shaft 414 and another cardan joint 378 linking the bottom end of the second cardan shaft to a gearbox 377. The gearbox turns an articulated lifting linkage 376 coupled to one of the parallel arms 370 of the parallel arm frame 336. Rotating the second cardan shaft 414 by its actuator 216 selectively raises or lowers the lifting linkage 376, lifting or lowering the parallel arm frame 336, the outer leaf removal device 176, the air cannon 226, the core ejector 142, and the core stabilizer 350.

Figure 8:
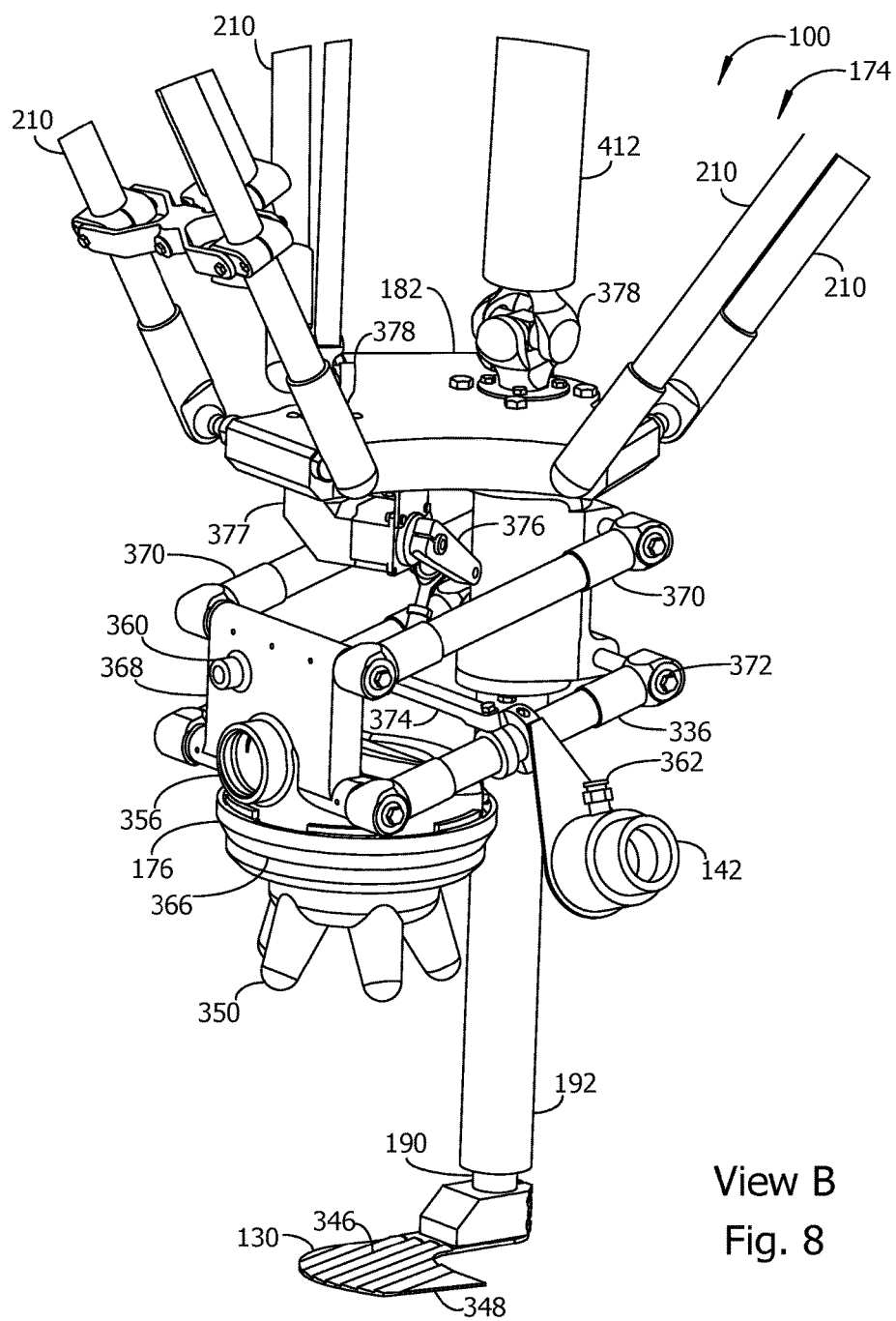
FIG. 8 is a partial pictorial view B of the example of a TCP and outer leaf removal device from FIG. 5, showing the outer leaf removal device and its attached core stabilizer in an example of a lowered position.
Figure 9:
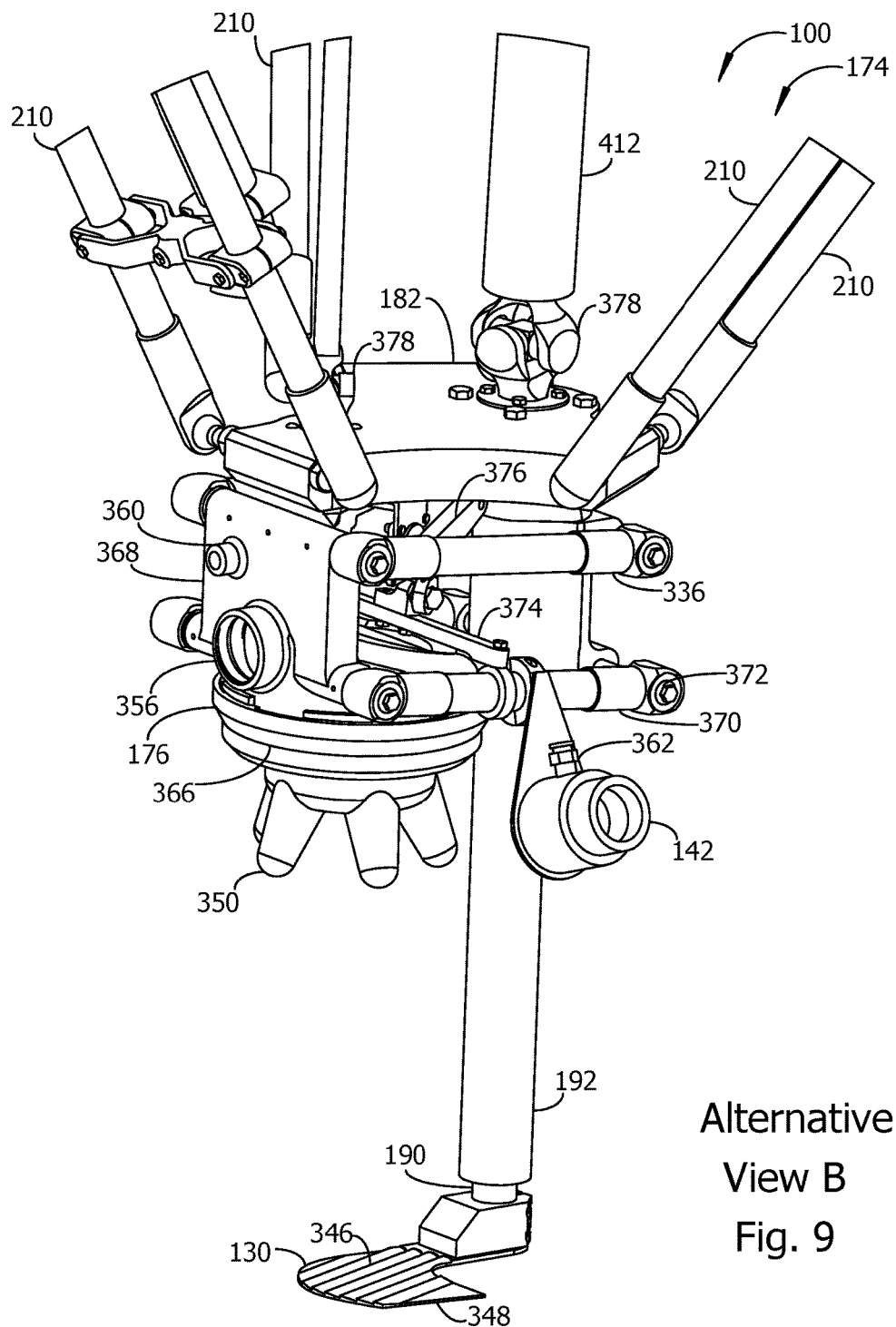
FIG. 9 continues the example of FIG. 8 in an alternative view B showing the outer leaf removal device in an example of a raised position.

An enlarged partial view of the TCP 182, outer leaf removal device 176, and other components appears in View B in FIG. 8 and Alternative View B in FIG. 9. FIG. 8 shows the outer leaf removal device 176 in an example of a lowered position relative to the TCP 182. A lifting bar 374 coupled to two of the parallel arms 370 and to the lifting linkage 376 is visible behind the core hold down pivot plate 368. The parallel arms are rotatably coupled to the TCP 182 and pivot plate 368 by arm pivots 372. FIG. 9 continues the example of FIG. 8, showing the outer leaf removal device 176 in an example of a raised position relative to the TCP 182.

Figure 10:
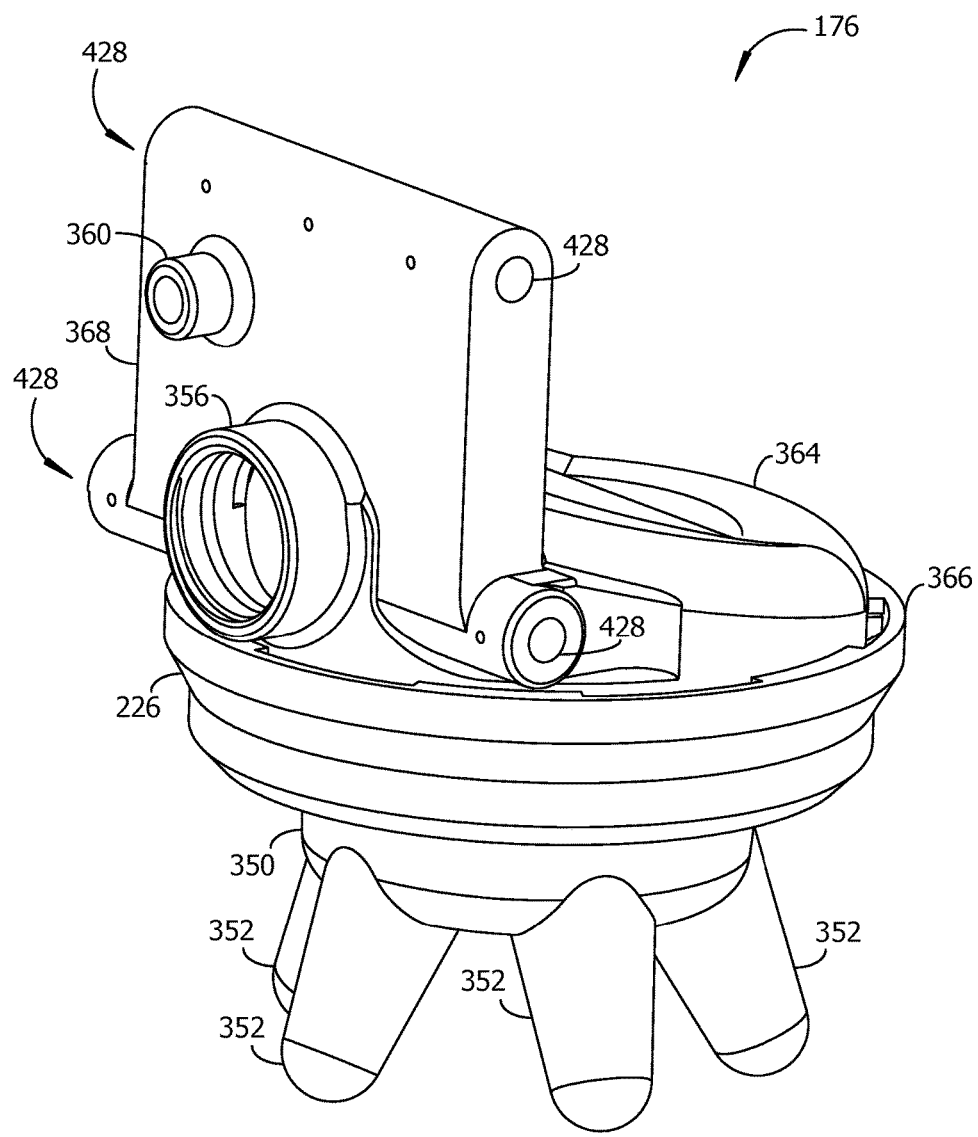
FIG. 10 is a pictorial view of an example of parts of an outer leaf removal device.
Figure 12:
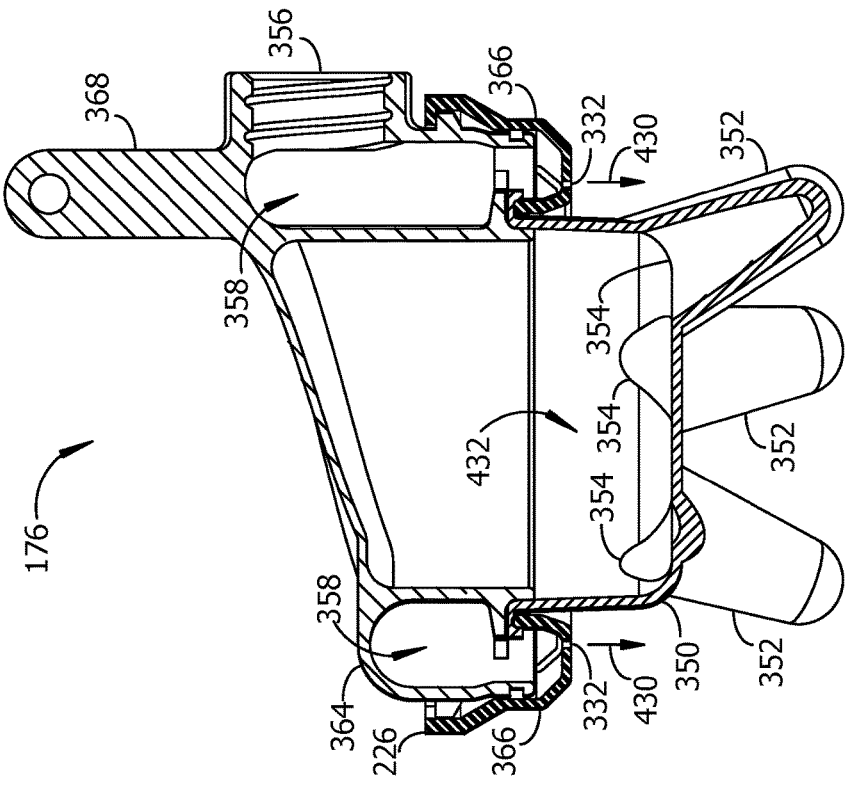
FIG. 12 is a cross-sectional view A-A of the example of an outer leaf removal device of FIGS. 10-11. A location and viewing direction for section A-A is marked by line A-A in FIG. 11.
Figure 11:
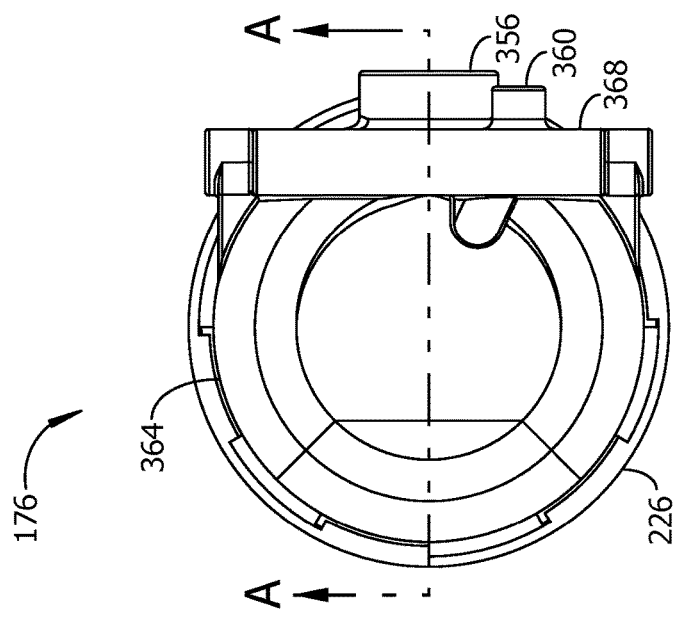
FIG. 11 is a view toward the top side of the example of an outer leaf removal device from FIG. 10.

Some details of the outer leaf removal device 176 are shown in FIGS. 10-14. In the example of FIG. 10, the outer leaf removal device 176 includes the air cannon 226, arm pivot apertures 428 formed in the pivot plate 368 for the parallel arms 170, the air cannon cap 364, air cannon base 366, and the core stabilizer 350 with fingers 352. A section line labelled A-A in FIG. 11 shows a position and viewing direction for the cross-sectional view of the outer leaf removal device 176 in FIG. 12. The air cannon cap is formed with two void spaces separated from one another, a manifold 358 for the air cannon 226 and a void space 432 extending from the central interior space in the air cannon cap 364 into the hollow interior of the core stabilizer 350 and the hollow interiors 354 of the flexible fingers 352 extending outward from the core stabilizer. The hollow interior 432 of the core stabilizer 350 and air cannon cap 364 is in fluid communication with the air coupling 360 on the pivot plate 368, enabling the controller 148 to force air into or withdraw air from the void space 432. Removing air from the void space 432 may cause the flexible fingers 352 to draw inward to grip a plant firmly.

The manifold 358 is in fluid communication with the air hose inlet coupler 356 and with one or more exit ports 332 positioned to direct outflowing air 430 downward toward the leaves of plants to be removed from a cut plant core. Outflowing air 430 from the air cannon 226 preferably strikes the cut plant with sufficient force to remove the plant's loose outer leaves from the plant's compact core. The controller 148 operates valves 462 to set the timing of air pulses from the air cannon 226 and core ejector 142 relative to motions of the cutting tool 130 and other parts of the harvester.

Figure 13:
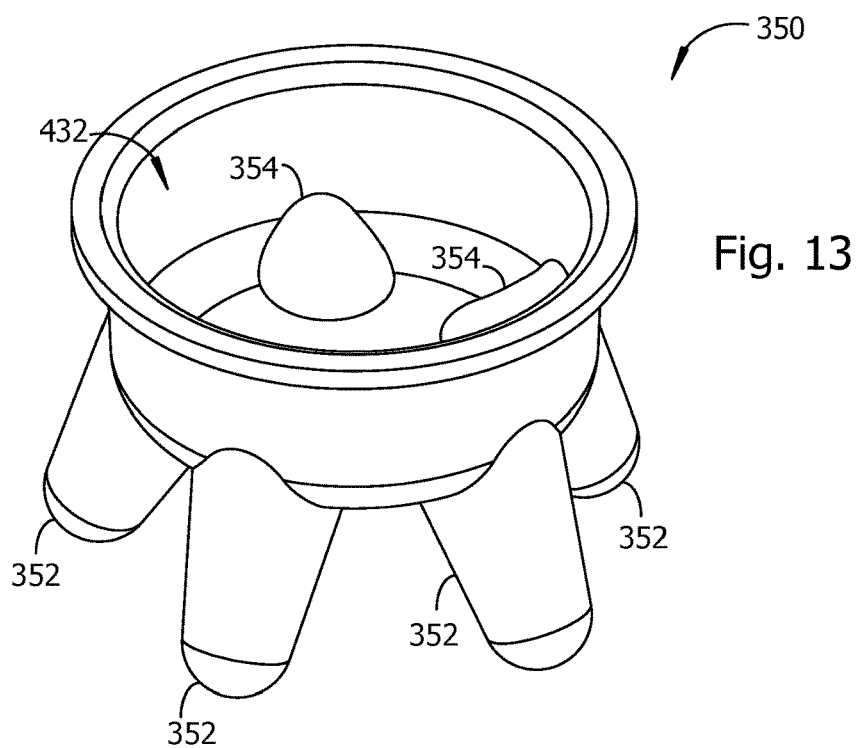
FIG. 13 is a pictorial view toward the top and side of an example of a core stabilizer with flexible fingers.
Figure 14:
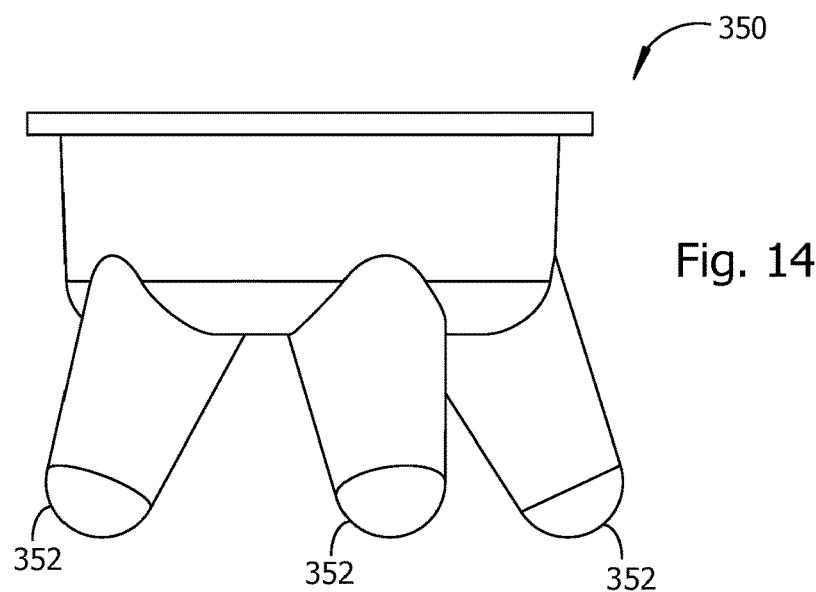
FIG. 14 is a side view of the example of a core stabilizer from FIG. 13.

An example of a core stabilizer 350 is shown in FIGS. 13-14. In FIG. 13, the example of a core stabilizer 350 is shown toward an interior void space 432 extending into an aperture 354 at the opening into each hollow finger 352. FIG. 14 shows a view of exterior surfaces of the core stabilizer 350. The example of a core stabilizer 350 in the figures has five flexible fingers 352. Core stabilizers may include some other number of fingers in alternative embodiments.

Figure 15:
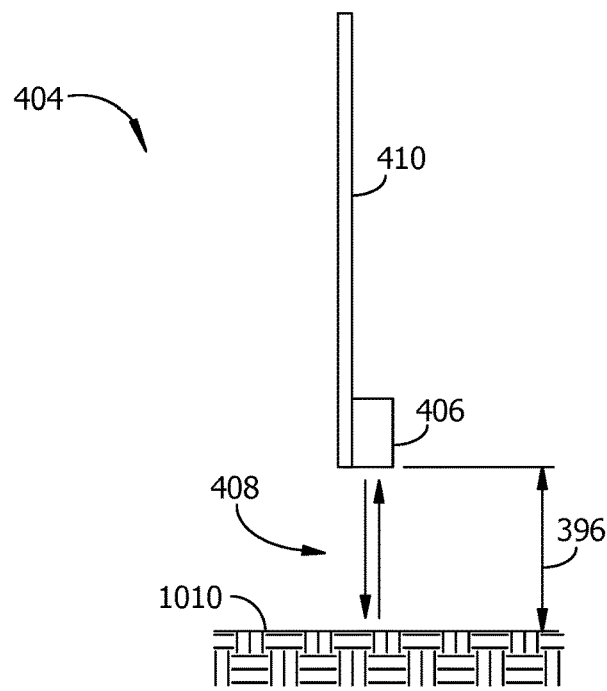
FIG. 15 is a side view of an example of a height sensor for determining a height above the ground of a blade height reference location in a harvester embodiment.
Figure 16:
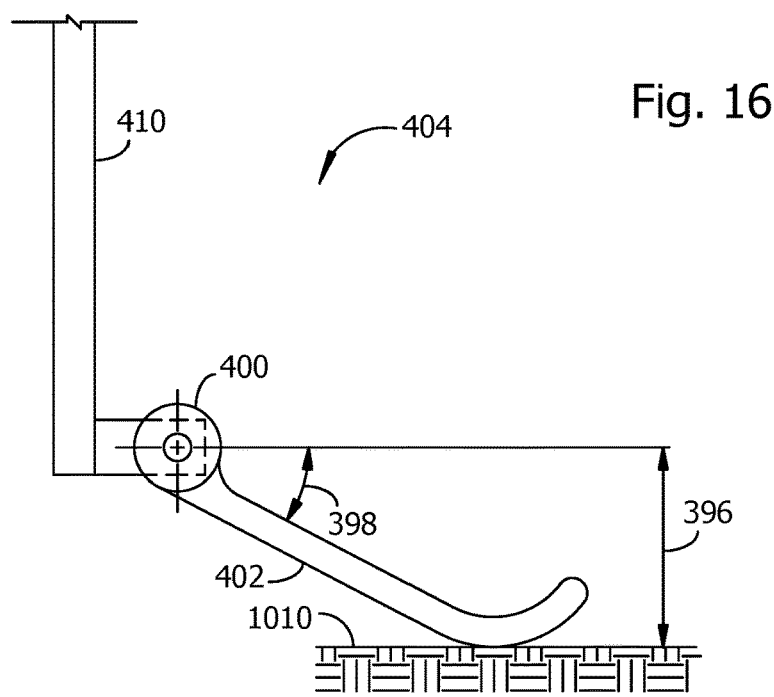
FIG. 16 is a side view of an example of an alternative implementation of a height sensor.

Alternative embodiments of a height sensor for measuring a sensed height 396 above the soil surface 1010 are shown in the examples of FIGS. 15-16. In FIG. 15, a noncontact height sensor 406 sends and receives transmitted and reflected energy 408 to measure a height value 396. In FIG. 16, a contact shoe 402 is attached to an angle measurement sensor 400. A measured change in an angle 398 is related to a sensed height 396 above the soil surface 1010.

Figure 18:
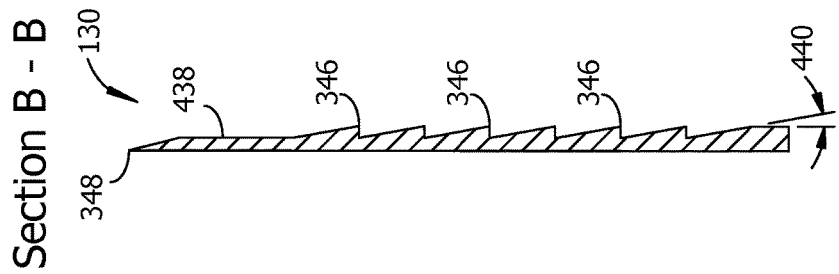
FIG. 18 is a cross-sectional view B-B of the example of a cutting tool of FIG. 17.
Figure 17:
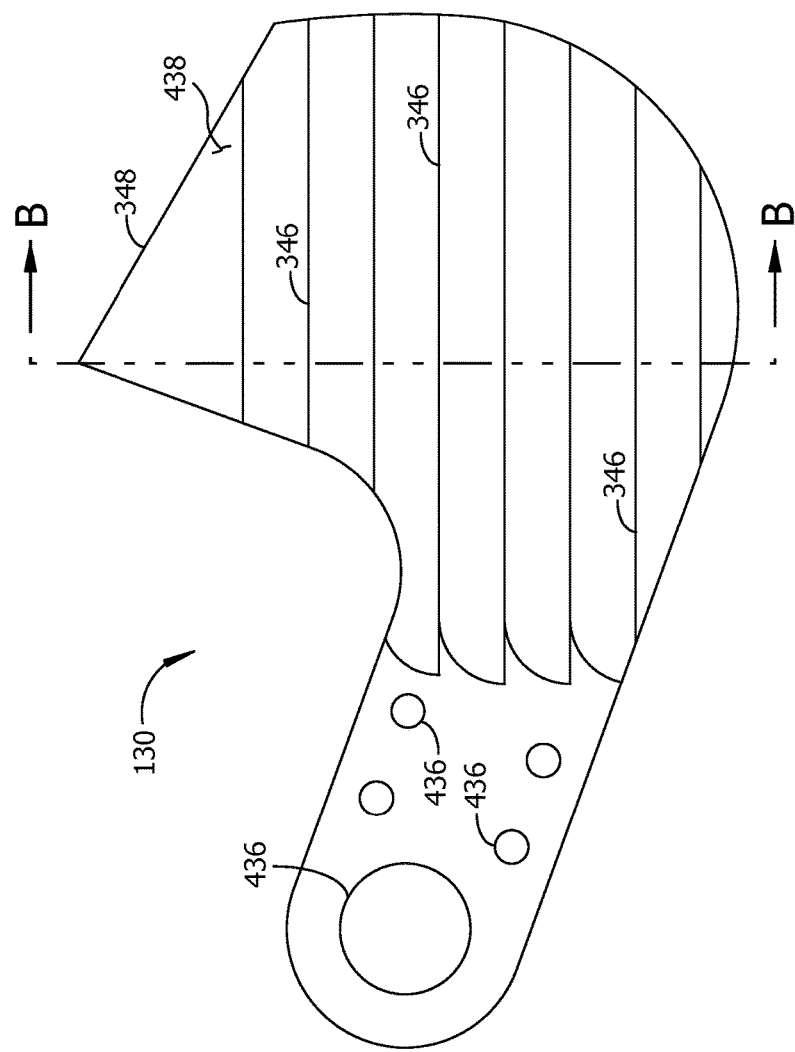
FIG. 17 is a view toward the top surface of an example of a cutting tool.

An example of a cutting tool 130 is shown in a view toward a top surface 438 of the tool in FIG. 17 and in a cross-sectional view B-B in FIG. 18. The cutting tool 130 is used by the harvester 100 to sever a plant from its stem at a preferred height above the soil surface, hold the cut plant against the core stabilizer while the outer leaves are removed, lift the cut core away from the soil surface, and carry the cut core with its outer leaves removed to the conveyer. The cutting tool may further be used to induce the cut plant to fall onto the conveyor. These operations may be performed in a different order than listed here. The cutting tool 130 is formed with one or more apertures 436 for attaching the tool to the central drive shaft 190. A plurality of ridges 346 having triangular profiles are formed into the top surface 438. The sloped face of each triangular ridge 346 tapers toward the cutting edge 348 of the cutting tool. The sloped face of a ridge 346 may be formed at an angle 440 in a range from about ten degrees to about 20 degrees. The ridges tend to slide easily under the cut portion of a plant stem while the cutting edge 348 is being driven into the plant, but tend to catch and hold the plant when the cutting tool is lifting and carrying the plant. The ridges 346 may be used to knock the cut plant core over in a preferred direction, for example to induce the cut plant core to fall onto the conveyor, by rotating the tool while firing the core ejector 142. The ridges 346 further resist a tendency of a cut plant to slide off the top surface 438 of the cutting tool 130 while the outer leaves are being removed by the air cannon and while the cutting tool is lifting the plant away from the soil surface and carrying the plant toward the conveyor. By holding the plant in place while the TCP and cutting tool accelerate away from the plant's cut roots, the ridges 346 facilitate faster operation of the harvester embodiment 100 by allowing more plants to be cut and moved to the conveyor per unit of time.

Examples of an alternative harvester embodiment 100 are shown in the examples of FIGS. 19-23. FIG. 19 includes an example of a plant core 1002 in a plant to be cut 1000 having an open core 1018 characterized by loose leaves near the center of the plant. Outer leaves 1004 surround the open core and will preferably be removed after the core is cut. Another example of a plant core 1002 in a plant to be cut 1000 includes an example of a closed core 1016 characterized by tightly wrapped leaves and a well-defined crown or top.

A harvester embodiment 100 with an example of an alternative cut and lift mechanism 174 appears in FIG. 19. The example cut and lift mechanism 174 in FIG. 19 includes a cutting frame 102 coupled by a cutting frame bar 110 to vertical frame members (108, 108B). The cutting bar 110 couples to the vertical frame members 108 at support flanges 158. The cutting frame 102 may extend or retract in a z-axis (i.e., vertical) direction 304. A support 112 beam is joined at one end to a lateral frame member 106. A pneumatic cylinder 188 attached to the support beam 112 and cutting frame 102 absorbs shock and vibration transmitted through the frame, stabilizing the frame and improving positioning accuracy of the cutting tool 130.

The cutting frame 102 extends and retracts in a vertical direction by the action of at least one lift actuator 118. The lift actuator positions the cutting tool 130 a preferred distance above the ground and lifts the cutting tool and cut plant core after the plant is severed from its stem. In the example of FIG. 19, two vertical position actuators 118 each have a stationary part 128 coupled to the cutting frame bar 110. Each lift actuator 128 includes an actuator shaft 114 that may extend and retract relative to the stationary part. The bottom end of each actuator shaft 114 connects to a lower crossbar 160, raising and lowering the lower crossbar relative to the cutting frame bar 110. At least one cutting frame vertical support 120 connects the lower crossbar 160 to the upper crossbar 122. In the example of FIG. 19, two vertical supports (120, 120B) are included in the cutting frame 102. A heel plate 124 attaches to the lower ends of the vertical supports 120. In some embodiments, the heel plate is formed with a heel plate aperture 126 having a diameter sized to admit the core 1002 of the plants to be harvested 1000, but not the loose outer leaves 1004 of the plant.

Figure 20:
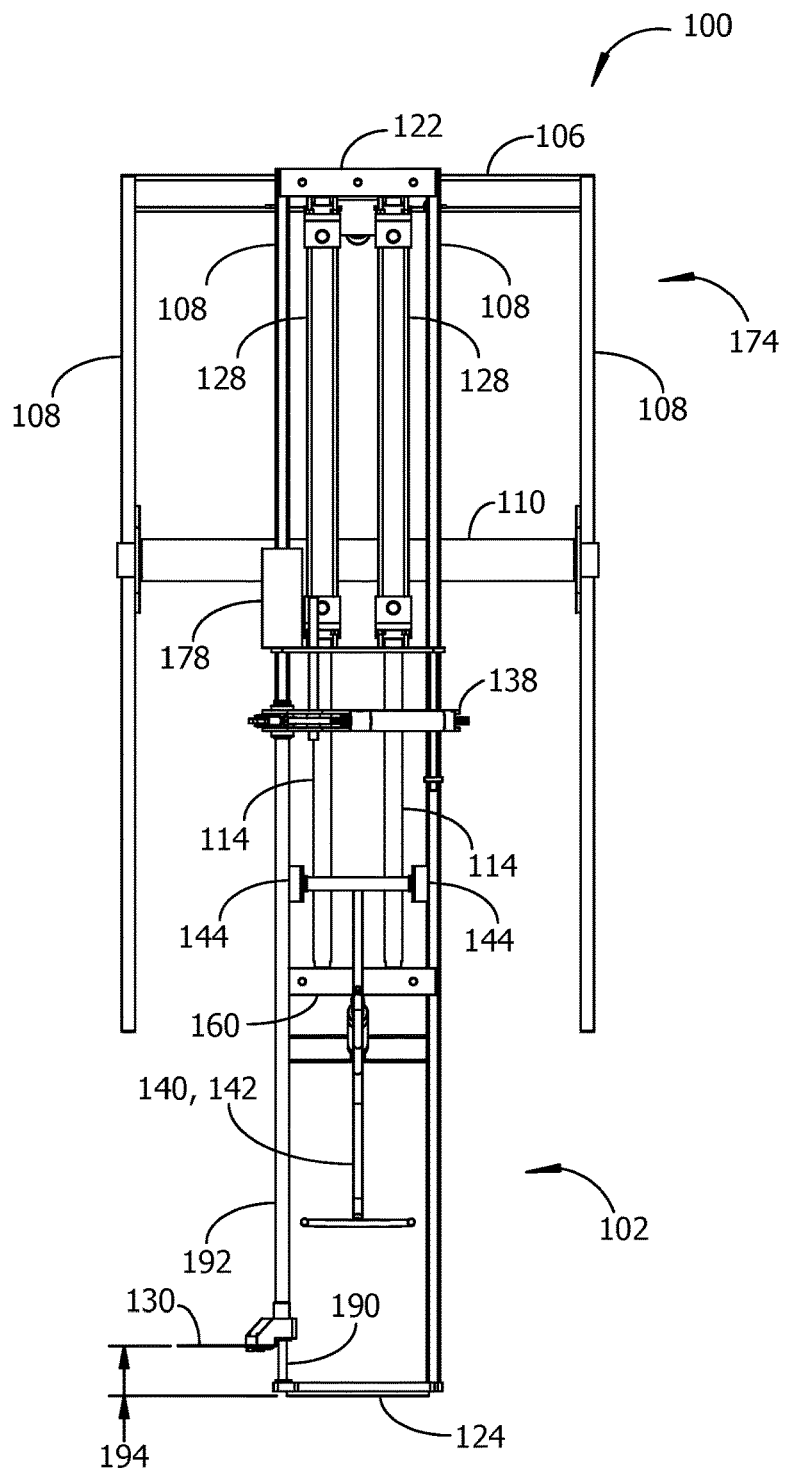
FIG. 20 is a view toward a side of the example cutting and lifting mechanism of FIG. 19.

In some embodiments, a cutting device 130 passes across a top surface of the heel plate to sever the stem of a plant to be harvested passing through the heel plate aperture 126. In the example of FIG. 20, the cutting device 130 is a sharp blade 130 attached to a hollow sleeve 192. A central shaft 190 fixed to the cutting frame passes through the hollow sleeve. The cutting tool 130 and sleeve 192 may rotate about the shaft 190 and slide up and down along the shaft. The sleeve 192 rotatably couples to a bottom bearing 136 attached to the vertical frame member 108 and a top bearing 134 attached to the vertical frame member. Operation of the cutting tool actuator 138 causes the sleeve 192 and blade 130 to rotate. Operation of a cutting tool height actuator 178 (ref. FIG. 20) may raise and lower the cutting tool 130 by a selected height 194 relative to the heel plate 124.

The example cutting frame 102 in FIG. 19 includes a generally disk-shaped heel plate 124 with a central aperture 126 that is connected to two vertical frame members 108. An embodiment may alternatively include a heel plate that is connected to only one vertical frame member. A heel plate for connection to only one vertical frame member may be given a rectangular or wedge shape without an aperture sized for admittance of the core of a plant to be harvested. Instead, the heel plate may land next to a plant to be harvested when the cutting frame is in its extended position. A harvester with a heel plate connected to only one vertical frame member may include an air nozzle directing a blast of compressed air at a plant to be harvested to push the outer leaves away from the plant core when the core is cut from the stem.

The example cutting frame 102 in FIG. 20 includes two vertical frame members 108. An embodiment may alternatively include only one vertical frame member 108. An embodiment with only one vertical frame member may optionally include only one vertical position actuator 108.

In some embodiments, the severed core of a harvested plant is pushed out of the cutting frame 102 by a core ejector 142. An ejector arm 142 is an example of a core ejector 140. The ejector arm may be driven in rotation about an ejector bearing 144 by an ejector actuator 143. A core ejector 142 may alternately be implemented as a nozzle and electrically operated valve coupled to a source of compressed air.

Figure 21:
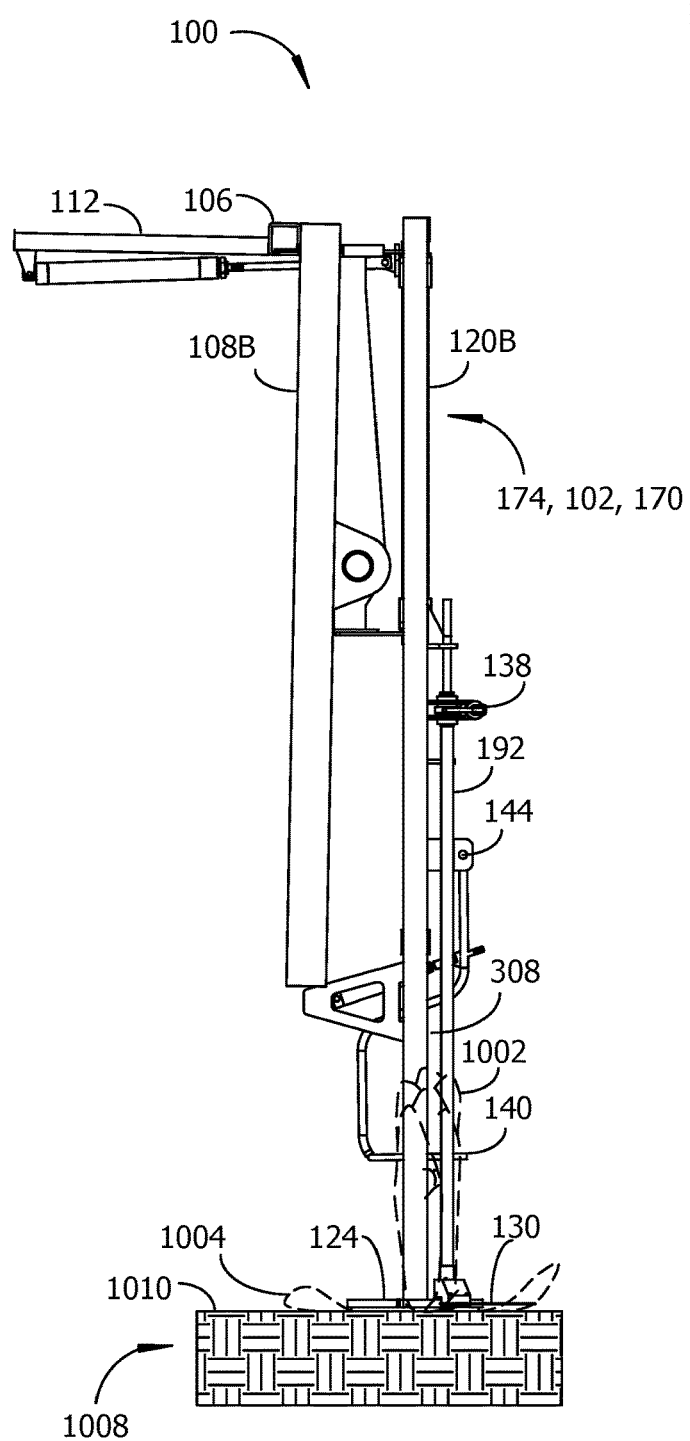
FIG. 21 is a view toward another side of the example cutting and lifting mechanism of FIGS. 19 and 20, showing an example of a cutting frame in an extended position, positioned for harvesting a core of a leafy plant.

FIG. 21 shows another side view of the example cut and lift mechanism 174 of FIGS. 2-3. In the example of FIG. 21, the example harvester 100 is shown with the cutting frame 102 in an extended position 170. The cutting frame is preferably extended far enough during harvesting to sever a plant stem without damaging the core 1002 of the plant. The heel plate 124 may be lowered until it contacts the ground 1008 to set a reference datum at the surface of the ground 1010 for the height of a cut 194.

In some embodiments, the ejector arm 140 is positioned to engage with a cut plant core far enough down from the top of the core to reliably eject the core out of the cutting frame and into a bin or onto a conveyor (not illustrated). In the example of FIGS. 20 and 21, the extensible shafts 114 of the lift actuators 118 are shown in an extended position, lowering the heel plate 124 relative to the cutting frame bar 110.

Figure 22:
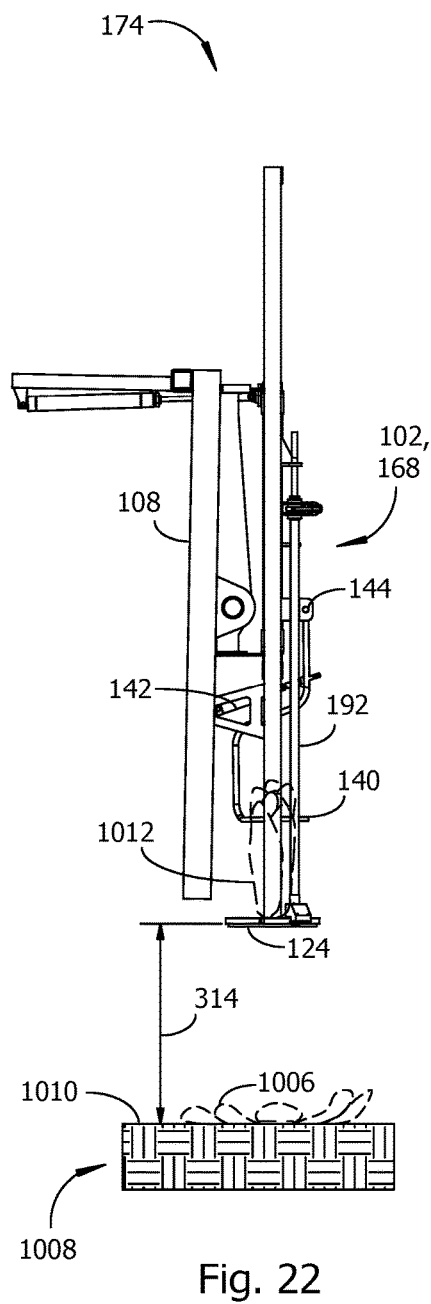
FIG. 22 continues the example of FIG. 21, showing an example of a cut core lifted by the cutting and lifting mechanism.
Figure 23:
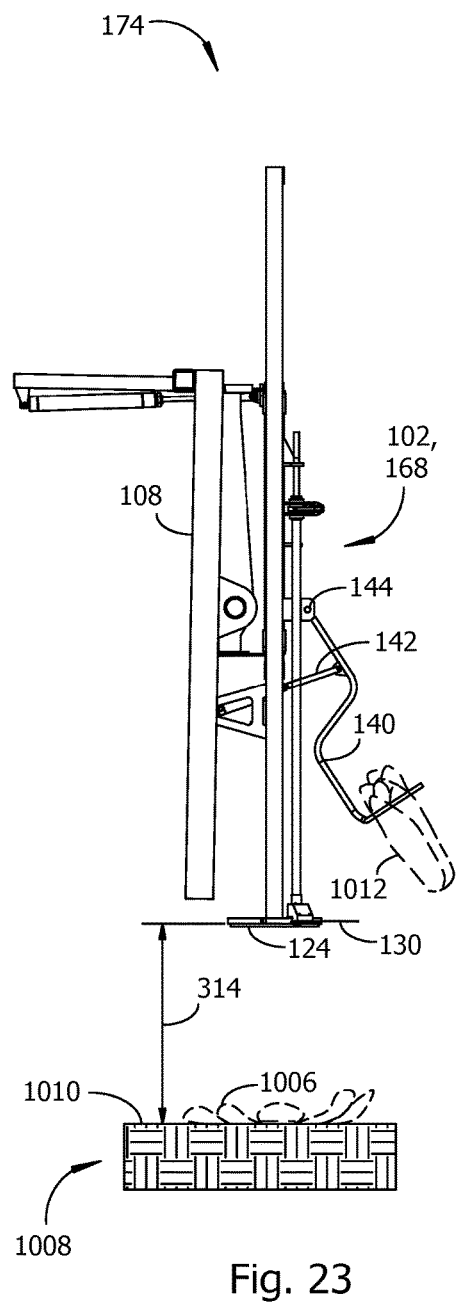
FIG. 23 shows a view toward the same side of the example cutting and lifting mechanism as FIG. 22, with the cutting frame in an example of a retracted position and an example of a core ejector pushing a cut core out of the cutting and lifting mechanism.

In the example of FIG. 22, the example cut and lift mechanism 174 is shown in its retracted position 168, with the heel plate 124 raised vertically above the surface 1010 of the ground 1008 by a vertical separation distance 314. The cut plant core 1012 may rest against the blade 130 while the cutting frame is lifted. The cutting frame 102 may preferably be lifted high enough to pass over the crown of an uncut plant to avoid bruising the plant. Discarded leaves 1006 remain on the soil surface 1010 after the cut plan core 1012 is lifted. FIG. 23 continues the example of FIG. 5, showing an example of a cut core 1012 being removed from the cutting frame by the core ejector 142.

Figure 24:
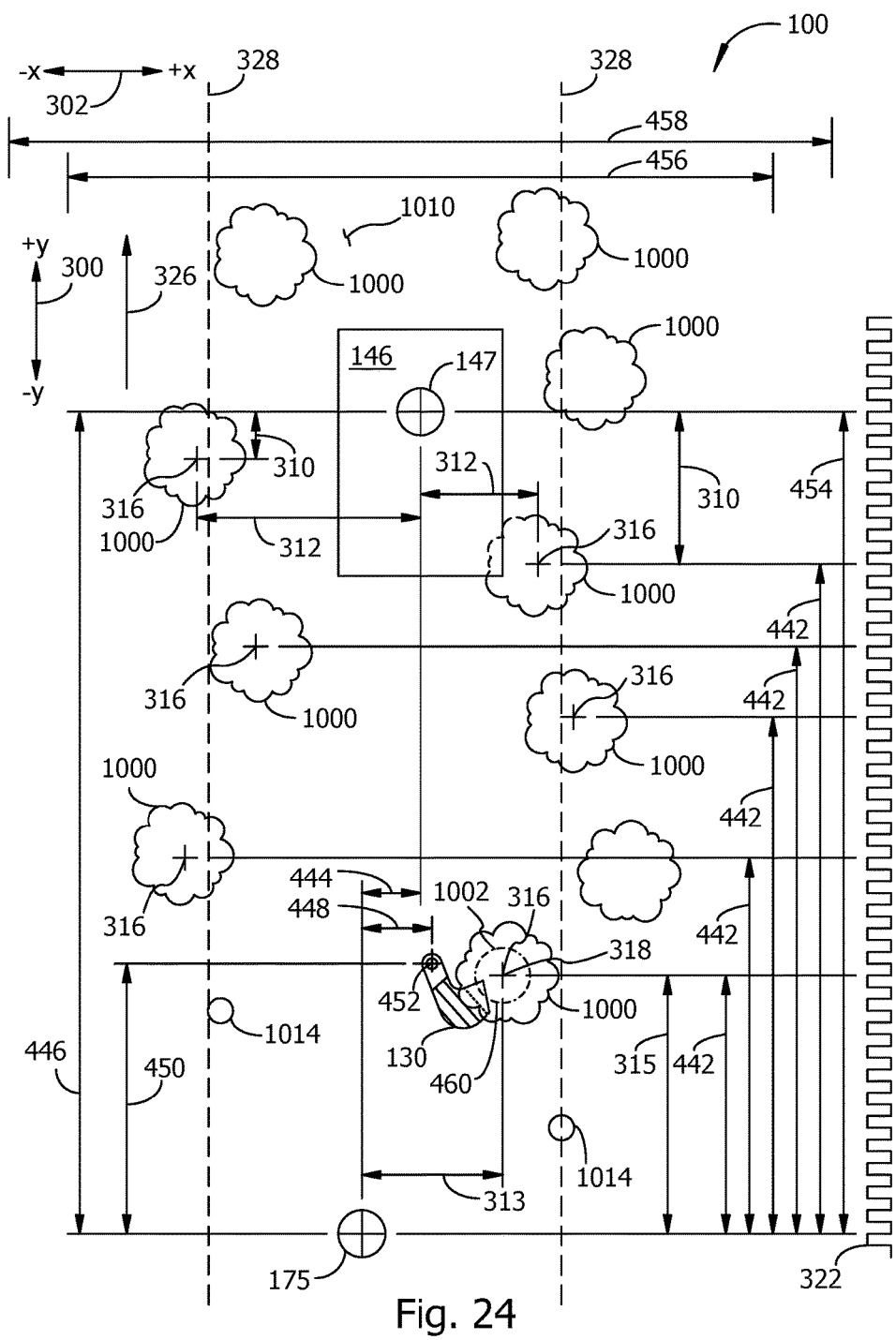
FIG. 24 shows a view from above of two rows of plants to be harvested, with examples of distances and directions related to operation of a harvester embodiment.

FIG. 24 shows examples of measurements made by a harvester embodiment 100 for sensing the centers of plants to be harvested and placing the cutting tool 130 for cutting and lifting a plant. The viewing direction for FIG. 24 is downward toward the soil surface 1010. Plants 1000 disposed in rows 328 are separated from one another at irregular intervals in the lateral (x-axis) 302 and longitudinal (y-axis) 300 directions. A row of plants 328 may be referred to as a plant line 328. A harvester embodiment 100, represented in FIG. 24 by the plant center locator 146 and the cutting tool 130, travels along the plant lines 328 in the direction 326 that places the plant center locator 146 ahead of the cutting tool 130. As the plant center locator 146 passes along a row, it collects data related to the positions of edges and/or surfaces of the plants to be harvested 100 and determines from the data a sensed plant center position 316 corresponding to coordinate values for the center of the core of each plant within range. The coordinates determined by the plant center locator 146 may have algebraically signed numerical values referenced in magnitude and direction to a coordinate origin 147 in the plant center locator 146. For each plant 1000 within the sensing range 458 of the plant center locator 146, coordinates for a sensed plant center 316 may be output from the plant center locator 146 to the controller 148. For each plant center 316, the controller 148 may store in memory 150 a coordinate 312 in the x-direction 302, a coordinate 310 in the y-direction 300, and a coordinate in the vertical (z) direction.

The support frame 104 and parts of the protection cage 105 establish a fixed spatial relationship in the x-(302), y-(300), and z-directions (304) between the coordinate origin 147 of the plant center locator 146 and a home position coordinate origin 175 for the cut and lift mechanism 174. For example, there may be a fixed lateral separation distance 444 and a fixed longitudinal separation distance 446 between the coordinate origin 147 for the plant center locator 146 and the home position coordinate origin 175. The controller 148 may take the algebraic sum of the fixed lateral separation distance 444 and the x-coordinate 312 to form an x-axis position coordinate 313 for the center 318 of a plant to be cut relative to the home position coordinate origin 175. The controller may further take the algebraic sum of the fixed longitudinal separation distance 446 and the y-coordinate 310 to form a y-axis position coordinate 315 of the center 318 of the plant to be cut relative to the home position coordinate 175. A z-axis coordinate for the height of a cut relative to the home position 175 may be formed by a similar procedure. The home position 175 may have a fixed vertical separation distance from the blade height reference surface 394 on the transport 200 and/or the top plate 212 of the cut and lift mechanism 174. The z-axis coordinate for the height of a cut above the soil surface may be selected to produce a plant core 1002 with a preferred plant core diameter 460.

Any of the coordinates in the y-direction may be stored as a pulse count value 442 equal to a number of pulses in the pulse output signal 322 produced by the rotary encoder 156 over the corresponding longitudinal separation distance relative to the home position origin 175. The number of pulses per unit of linear travel of the transport 200 may be substantially higher than implied by the graphical representation of the pulse output signal 322 in the example of FIG. 24. Each of the examples of fixed distances shown in FIG. 24 has a corresponding fixed pulse count value as suggested in the figure, and each of the variable distances has an associated pulse count for the measured distance. For example, the fixed longitudinal distance 446 from the coordinate origin 147 for the plant center locator 146 to the coordinate origin 175 for the home position of the cut and lift robot has a corresponding pulse count 454 as marked along pulse output signal 322. Storing longitudinal distances by their corresponding pulse counts reduces the need to move the transport at a constant velocity along a plant line 328 and reduces the need to accurately measure transport speed and/or time intervals to determine distances between cutting locations 318. After receiving from the controller 148 the coordinates relative to the home position 175 of a center position 318 of a plant to be cut, the cut and lift mechanism may move the TCP over a longitudinal distance 450 and a lateral distance 448 to place a reference location 452 for the cutting tool 130 in a preferred position relative to the center 318 of the plant to be cut. Coordinates received by the cut and lift mechanism 174 may be selected by the controller to be within the range of lateral motion 456 of the TCP 182.

Figure 25:
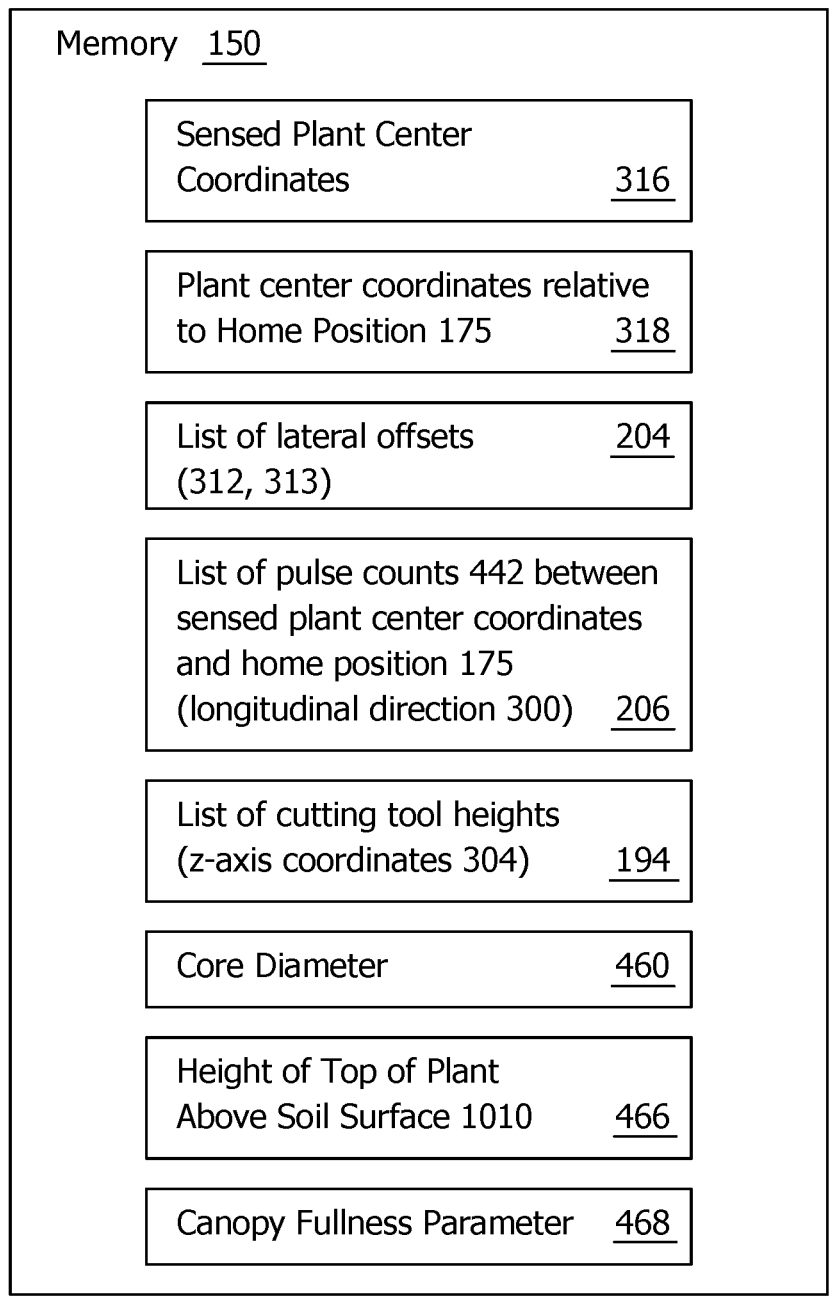
FIG. 25 includes examples of information stored in the memory of the example of a controller from FIG. 3 and FIG. 4.

FIG. 25 lists examples of some data items that may be retained in the memory 150 of the controller 148, including, but not limited to, the sensed plant center coordinates 316 relative to the coordinate origin 147 for the plant center locator 146, the plant center coordinates 318 relative to the home position 175, a list 204 relative to the coordinate origins (147, 175) of lateral offsets (312, 313), a list 206 of pulse counts 442 between sensed plant locations 316 and the home position 175 in a longitudinal direction, and a list 194 of cutting tool heights associated with each lateral offset 204. Other examples of values retained in memory 150 include, but are not limited to, the preferred core diameter 460, a height 466 of the top of a plant above the soil surface 1010, and a canopy fullness parameter 468 determined from measurements of core and outer leaf positions made by the plant center locator 146. The controller 148 may optionally avoid cutting any plant having a measured core diameter that less than the core diameter 460 stored in memory 150. The controller 148 may optionally avoid cutting any plant having a measured height that is less than the height 466 stored in memory. The controller 148 may optionally set a cutting height 194 according to the stored value of the canopy fullness parameter 468.

Figure 26:
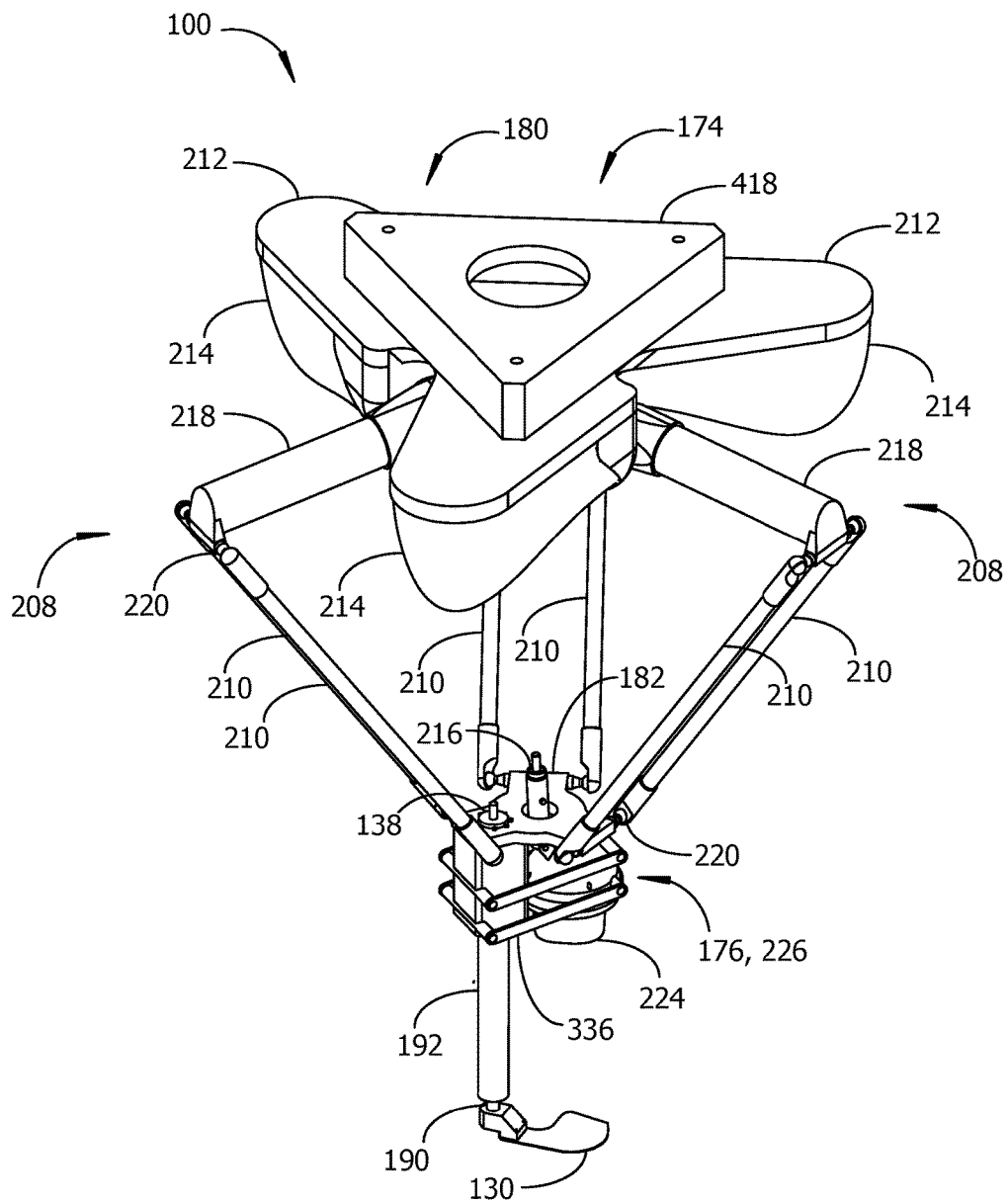
FIG. 26 is a pictorial view of another alternative embodiment of a cut and lift mechanism.
Figure 27:
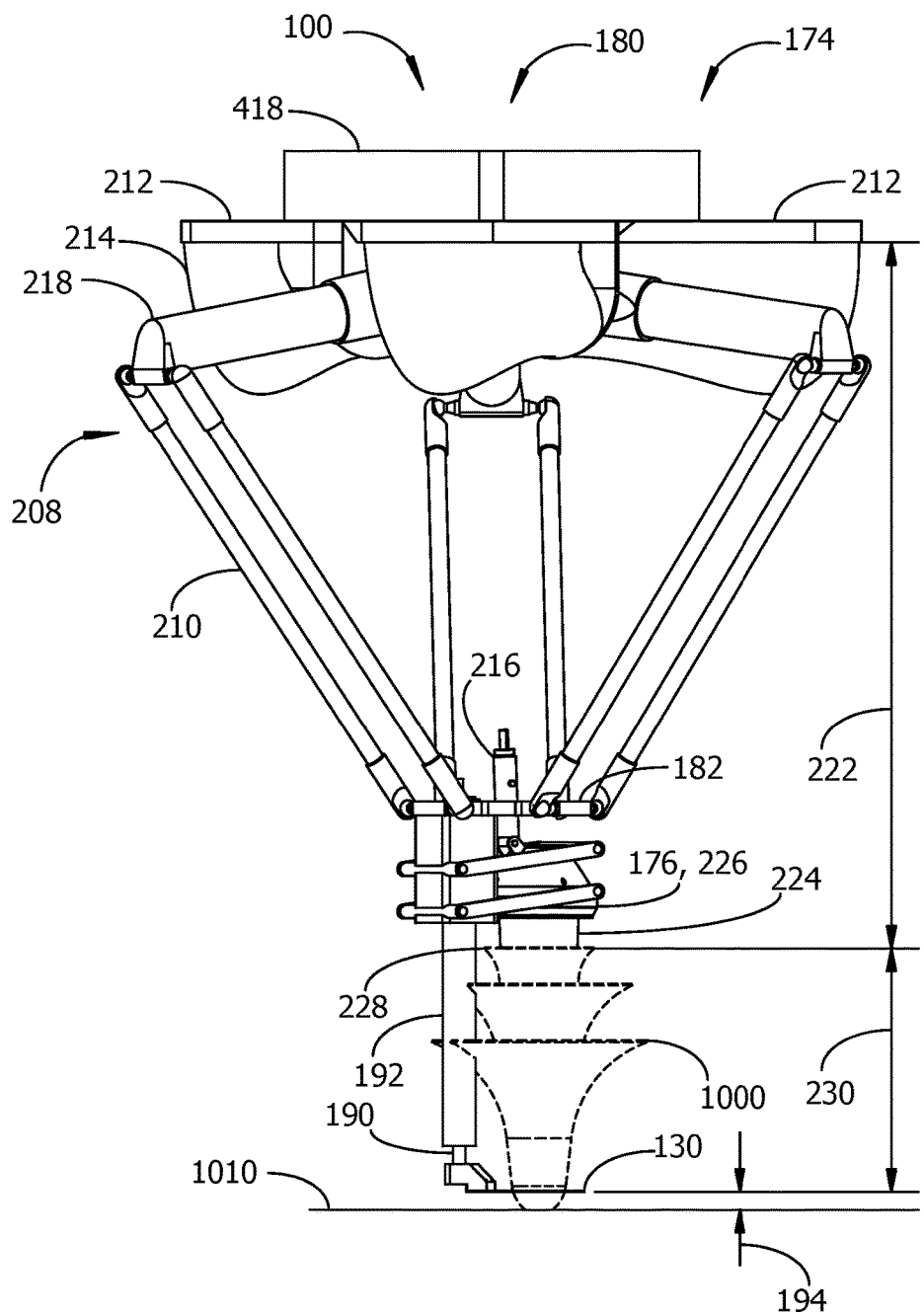
FIG. 27 is a view toward a side of the example cut and lift mechanism of FIG. 26, showing an example of the cutting blade positioned for harvesting a leafy plant.

FIGS. 26-27 show examples of an alternative embodiment of a cut and lift mechanism 174. The top plate 212 may have an attached stiffening spacer 418 to increase the structural rigidity of the top plate 212. The core stabilizer vertical position actuator 216 may be attached directly to the TCP 182 without an intervening cardan shaft. The cutting tool actuator 138 may be attached directly to the TCP 182 without an intervening cardan shaft. The core stabilizer may be formed as a flexible cylinder with a compressible bottom end.

A cutting height 194 may be established from the surface 1010 of the ground as for previously described embodiments. Alternatively, a cutting height 194 may be established by displacing the cutting tool a selected distance downward from a reference datum such as the top surface of the top plate 212 or another convenient reference position on an embodiment. The plant center locator 146 may determine a distance 222 downward from the reference position to the top 228 of a core to be harvested. An additional vertical offset 230 may be added to the distance 222 downward to accurately position the cutting tool 130 relative to the stem and core of the plant to be harvested.

Figure 28:
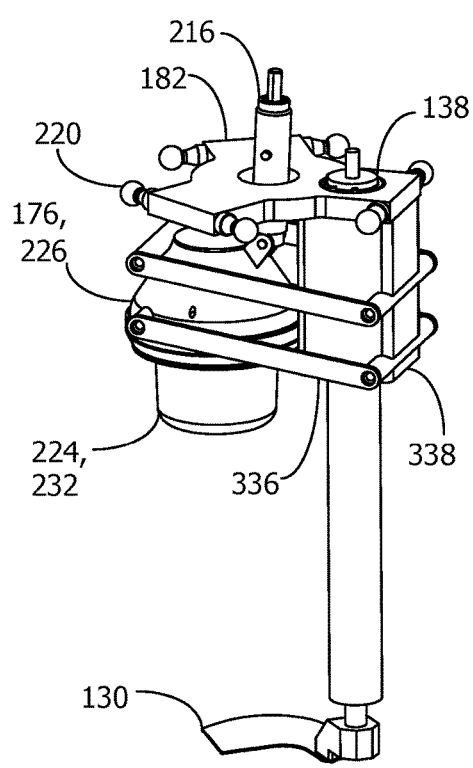
FIG. 28 shows a pictorial view of an alternative embodiment of a TCP carrying a cutting tool and cutting tool actuator, and further showing alternative examples of a core stabilizer and an outer leaf removal device.

FIGS. 28-31 show examples of an air cannon 226, core stabilizer 224, and cutting tool 130 attached to a tool carrier 182 on a delta robot. The example air cannon 226 and core stabilizer 224 may be used with other embodiments of a cut and lift mechanism, for example the embodiments of FIGS. 5-9 and FIGS. 19-23. In the example of FIG. 28, the air cannon 226 and core stabilizer 224 are coupled by a parallel-arm frame 336 to the housing 338 for the cutting tool actuator 138. A core stabilizer vertical position actuator may be included to change a vertical separation distance between the core stabilizer and cutting tool. A core stabilizer 224 may be implemented as an inflatable bladder 232. The air cannon 226 includes exit ports 332 directing bursts of compressed air downward onto loose leaves to be separated from a cut plant core supported between the cutting tool and core stabilizer. Bursts of compressed air flow out of a manifold 334 through exit ports 332 arranged around the core stabilizer 224. The bursts of air are preferably strong enough to break the unwanted outer leaves from the core of a cut plant.

Figure 29:
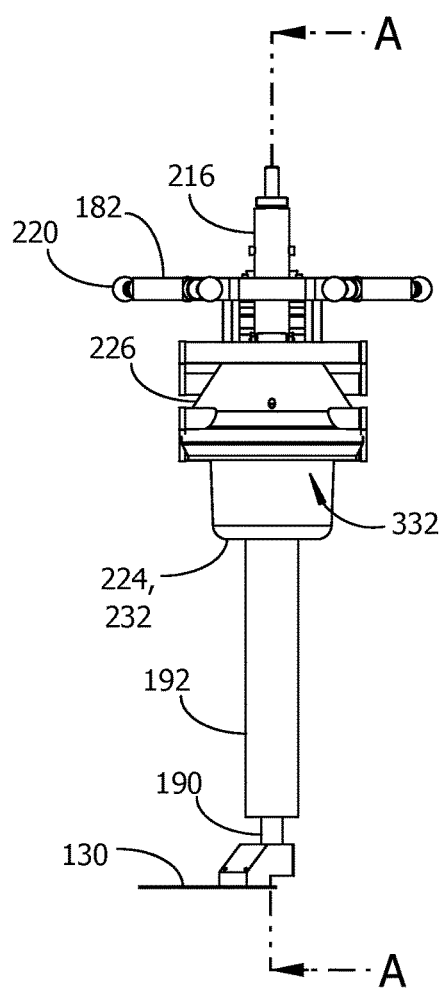
FIG. 29 shows a view toward a side of the example embodiment of FIG. 28.

FIGS. 30-31 show some internal details of the embodiments of FIGS. 28-29. Section C-C in FIG. 30 shows an example of an inflatable bladder 232 having a concave surface 234 for receiving the crown of a plant core. The core stabilizer 224 may be implemented as a resilient polymer pad or as an inflatable bladder 232. The cutting tool actuator 138 in the example of FIG. 13 is coupled to the shaft 190. The shaft 190 passes through the sleeve 192 fixed to the housing 338. The cutting tool actuator 138 rotates the cutting tool 130 and shaft 190 relative to the sleeve 192. In FIG. 30, the core stabilizer vertical actuator 216 is shown in its retracted position, pulling the parallel-arm frame upward. In the alternate cross section C-C in the example of FIG. 31, the vertical actuator 216 is shown in its extended position, pushing the air cannon 176 and core stabilizer 224 downward toward the cutting tool 130.

Figure 32:
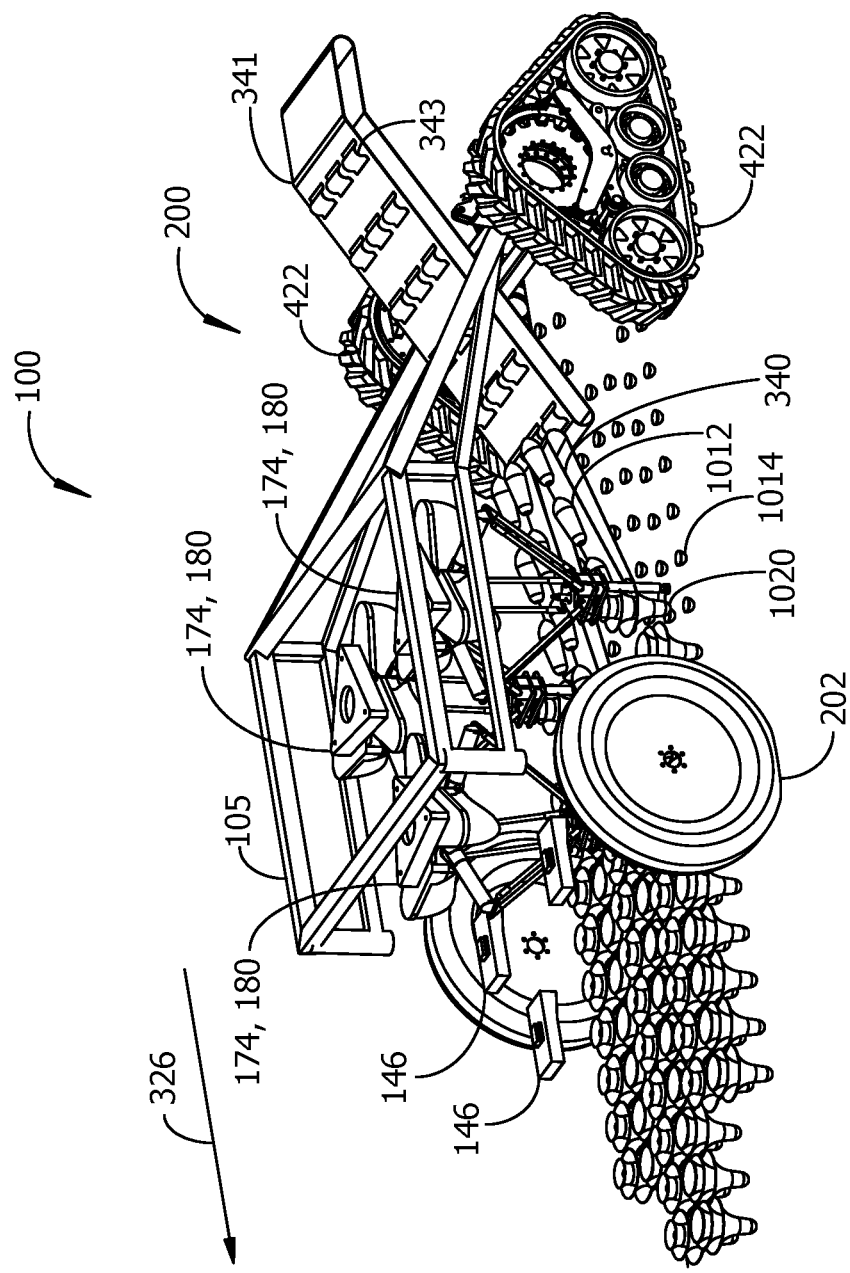
FIG. 32 shows an example of an embodiment including three core locators and three cut and lift mechanisms attached to a transport.

An example of a transport 200 carrying three examples of a cut and lift mechanism 174 is shown as a pictorial view in FIG. 32. In the example of FIG. 32, each cut and lift mechanism is a delta robot 180. Each delta robot 180 is directed by signals from one of three plant center locators 146, one plant center locator for each delta robot. Some of the structural members for holding delta robots and core locators to the support frame have been omitted in FIG. 32. The example harvester embodiment 100 moves along rows of plants to be cut in the direction marked by an arrow 326, lifting each cut plant 1020 on a cutting tool, removing outer leaves, and transferring cut cores 1012 to a conveyor system 340. Trimmed plant remnants such as cut stems 1014 remain in the ground after the cores are removed.

The example of a conveyor 341 in FIG. 32 has a flat surface. A conveyor with a flat surface may be used with any of the harvester embodiments described herein. A conveyor 341 with a flat surface may have projections 343 extending from the flat surface to limit a distance cut produce may roll down the conveyor.

An example of a method embodiment includes any one or more of the following steps, in any combination or sub-combination:

measuring a first lateral separation distance and a first longitudinal separation distance from a center of a plant to be cut to a reference point on a harvester;

measuring a second lateral separation distance and a second longitudinal separation distance from a cutting tool to the reference point;

determining a lateral blade displacement from the first lateral separation distance and the second lateral separation distance;

determining a longitudinal blade displacement from the first longitudinal separation distance and the second longitudinal separation distance;

moving the cutting tool by the lateral blade displacement and the longitudinal blade displacement;

activating the cut and lift mechanism to cut the plant with the cutting tool, thereby forming a cut plant;

while the cutting tool remains in contact with the plant:

removing an outer leaf from the cut plant to form a plant core; and lifting the plant core with the cutting tool; and removing the plant core from the cutting tool onto a conveyor.

The example method embodiment optionally includes any one or more of the following steps, individually or in any combination or sub-combination:

expressing the first and second lateral and longitudinal separation distances as lateral 312 and longitudinal 310 coordinates relative to a coordinate origin 147 on a plant center locator 146, expressing the lateral and longitudinal coordinates relative to coordinate origin 147 on the plant center locator 146 as corresponding lateral 313 and longitudinal 315 coordinates relative to a coordinate origin 175 on a cut and lift mechanism 174, and moving the cutting tool 130 relative to the coordinate origin 175 on the cut and lift mechanism 174 to the center 318 of a plant to be cut, wherein the lateral coordinate 313 relative to the coordinate origin 175 of the cut and lift mechanism 174 for the center 318 of the plant to be cut may be expressed as an algebraic sum of the lateral coordinate 312 from the plant center locator and a lateral offset 444 between the coordinate origins (147, 175) on the plant center locator and the cut and lift mechanism, and the longitudinal coordinate 315 of the center 318 of the plant to be cut may be expressed as an algebraic sum of the longitudinal coordinate 310 from the plant center locator and a longitudinal offset 446 between the coordinate origins on the plant center locator and the cut and lift mechanism;

expressing any one or more of the first longitudinal coordinate, the second longitudinal coordinate, and the longitudinal offset 446 as a corresponding number of pulses 442 from a rotary encoder;

measuring a diameter of the compact plant core;

setting a cutting height for the cutting tool according to the measured diameter;

measuring a height of a top end of the plant;

harvesting the plant when the measured height is greater than or equal to a minimum height value;

moving a core stabilizer into contact with a top end of the plant;

removing the outer leaf from the plant while holding the plant between the core stabilizer and the cutting tool, thereby forming a trimmed plant core;

directing a first pulse of air onto the plant while holding the cut plant between the core stabilizer and the cutting tool, wherein the first pulse of air has sufficient force to remove the outer leaf;

moving the cutting tool, the cut plant, and the core stabilizer as a unit; and directing a second pulse of air onto the plant, wherein the second pulse of air has sufficient force to move the cut plant onto the conveyor.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
   a support frame;
   a cut and lift robot coupled to said support frame;
   a tool carrying platform coupled to said cut and lift robot;
   an outer leaf removal device coupled to said tool carrying platform;
   a cutting tool attached to a cutting tool shaft, said cutting tool shaft coupled to said tool carrying platform;
   a controller in data communication with said cut and lift robot;
   a plant center locator in data communication with said controller;
   a top plate attached to said support frame and to said cut and lift robot;
   a cutting tool actuator attached to said top plate, said cutting tool actuator in data communication with said controller;
   a core stabilizer vertical position actuator attached to said top plate, said core stabilizer vertical position actuator in data communication with said controller;
   a first cardan shaft connected to said cutting tool actuator and to said cutting tool shaft; and
   a second cardan shaft connected to said core stabilizer vertical position actuator and rotatably coupled to said tool carrying platform.

2. The apparatus of claim 1, further comprising:
   a parallel-arm frame rotatably coupled to said tool carrying platform;
   a gearbox attached to said tool carrying platform, said second cardan shaft, and to said parallel arm frame, wherein a rotation of said core stabilizer vertical position actuator rotates said second cardan shaft and selectively raises and lowers said parallel-arm frame relative to said tool carrying platform.

3. The apparatus of claim 1, said outer leaf removal device further comprising:
   a cap formed with a first interior void space;
   a base formed with an aperture in fluid communication with said first interior void space, said aperture positioned to direct a flow of pressurized air from said first interior void space downward onto a plant to be harvested; and
   a core stabilizer attached to said base, said core stabilizer formed with a second interior void space and a plurality of flexible fingers.

4. The apparatus of claim 3, further comprising:
   a first inlet coupler for an air hose, said first inlet coupler in fluid communication with said first interior void space; and
   a second inlet coupler for an air hose, said second inlet coupler in fluid communication with said second interior void space.

5. The apparatus of claim 1, further comprising a conveyor attached to said support frame and a conveyor lift in data communication with said controller.

6. The apparatus of claim 5, wherein said conveyor is a v-trough conveyor.

7. The apparatus of claim 1, further comprising a height sensor in data communication with said controller, said height sensor positioned to measure a height above ground of a blade height reference location for setting a cutting height of said cutting tool.

8. The apparatus of claim 1, wherein said plant center locator includes an optical scanner.

9. The apparatus of claim 1, wherein said plant center locator includes a camera.

10. The apparatus of claim 1, further comprising a lateral positioner having a movable part attached to said support frame and a stationary part adapted for attachment to a transport.

11. The apparatus of claim 1, further comprising a core ejector attached to said tool carrying platform, wherein said core ejector is positioned to push a harvested plant out of said outer leaf removal device.

12. The apparatus of claim 1, further comprising a protection cage attached to said support frame, said protection cage surrounding said cut and lift robot.

13. The apparatus of claim 1, wherein said cut and lift robot is a delta robot.

14. The apparatus of claim 1, wherein said cutting tool is formed with a plurality of ridges on a top surface of said cutting tool, and each of said plurality of ridges is formed with a triangular profile.

15. The apparatus of claim 1, wherein said cut and lift robot positions said cutting tool to produce a harvested plant core with a preferred core diameter.

16. An apparatus, comprising:
   a support frame;
   a cut and lift robot coupled to said support frame;
   a tool carrying platform coupled to said cut and lift robot;
   an outer leaf removal device coupled to said tool carrying platform;
   a cutting tool attached to a cutting tool shaft, said cutting tool shaft coupled to said tool carrying platform;
   a controller in data communication with said cut and lift robot;
   a plant center locator in data communication with said controller; and
   a rotary encoder in data communication with said controller, said rotary encoder having a pulse output signal comprising a fixed number of pulses for a full revolution of a wheel.

17. The apparatus of claim 16, wherein said controller sets a longitudinal cutting position for said cutting tool in response to a count of pulses from said pulse output signal and a sensed plant center position from said plant center locator.

18. The apparatus of claim 16, wherein said controller converts each plant center coordinate in a longitudinal direction from said plant center locator to a pulse count value referenced to a home position of said cut and lift robot.

* * * * *